United States Patent
Bae et al.

(10) Patent No.: US 10,877,642 B2
(45) Date of Patent: Dec. 29, 2020

(54) USER INTERFACE APPARATUS IN A USER TERMINAL AND METHOD FOR SUPPORTING A MEMO FUNCTION

(71) Applicant: Samsung Electronics Co. Ltd., Suwon-si (KR)

(72) Inventors: Joo-Yoon Bae, Seoul (KR); Sung-Soo Kim, Bucheon-si (KR); Hwa-Kyung Kim, Seoul (KR); Jin-Ha Jun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/013,542

(22) Filed: Aug. 29, 2013

(65) Prior Publication Data

US 2014/0068517 A1    Mar. 6, 2014

(30) Foreign Application Priority Data

Aug. 30, 2012   (KR) .................... 10-2012-0095950

(51) Int. Cl.
*G06F 3/0484*   (2013.01)
*G06F 3/0488*   (2013.01)

(52) U.S. Cl.
CPC ...... *G06F 3/04842* (2013.01); *G06F 3/04883* (2013.01)

(58) Field of Classification Search
CPC ......... G06F 3/0482; G06F 2203/04807; G06F 3/04883; G06F 3/04842
See application file for complete search history.

(56) References Cited

U.S. PATENT DOCUMENTS

| | | | | |
|---|---|---|---|---|
| 5,063,600 A | * | 11/1991 | Norwood | ............... G06F 3/033 345/173 |
| 5,550,930 A | * | 8/1996 | Berman | ............... G06K 9/033 382/187 |
| 5,742,280 A | * | 4/1998 | Ohyama | ............ G06F 3/04883 345/173 |
| 5,748,974 A | * | 5/1998 | Johnson | ................ G06F 3/038 704/9 |
| 5,951,622 A | | 9/1999 | Nomura | |

(Continued)

FOREIGN PATENT DOCUMENTS

CN  101648077 A   2/2010
KR  10-2010-0112003 A  10/2010

(Continued)

OTHER PUBLICATIONS

Apple Corporation, Apple MessagePad Handbook, 1995, Apple Corporation.*

(Continued)

*Primary Examiner* — Jung-Mu T Chuang
(74) *Attorney, Agent, or Firm* — Jefferson IP Law, LLP

(57) ABSTRACT

A hybrid User Interface (UI) apparatus for supporting both handwriting and speech in a user terminal and a method for supporting the same are provided. The apparatus is configured to display, upon user selection of a whole or of part of the contents of a note on a screen, menu icons for processing the selected contents, and process, upon user selection of one of the displayed menu icons, the selected contents by a function corresponding to the selected menu icon.

13 Claims, 35 Drawing Sheets

(56) References Cited

U.S. PATENT DOCUMENTS

| | | | |
|---|---|---|---|
| 6,438,523 B1* | 8/2002 | Oberteuffer | G06F 3/038 382/186 |
| 6,622,119 B1* | 9/2003 | Ramaswamy | G06F 40/274 704/9 |
| 6,687,614 B2 | 2/2004 | Ihara et al. | |
| 6,868,383 B1 | 3/2005 | Bangalore et al. | |
| 7,003,308 B1* | 2/2006 | Fuoss | G06F 3/04883 345/173 |
| 7,137,076 B2* | 11/2006 | Iwema | G06K 9/00436 715/863 |
| 7,216,034 B2 | 5/2007 | Vitikainen et al. | |
| 7,224,991 B1* | 5/2007 | Fuoss | H04W 4/12 345/173 |
| 7,225,130 B2* | 5/2007 | Roth | G10L 15/19 704/253 |
| 7,231,293 B2 | 6/2007 | Lapstun et al. | |
| 7,418,136 B2 | 8/2008 | Goldfoot | |
| 7,450,763 B2 | 11/2008 | Gorbatov et al. | |
| 7,467,089 B2* | 12/2008 | Roth | G10L 15/22 704/251 |
| 7,496,484 B2 | 2/2009 | Agrawala et al. | |
| 7,506,271 B2* | 3/2009 | Wang | G06K 9/00436 715/809 |
| 7,512,483 B2 | 3/2009 | Matsuoka et al. | |
| 7,533,025 B2* | 5/2009 | Coffman | G06F 17/2818 704/257 |
| 7,546,382 B2 | 6/2009 | Healey et al. | |
| 7,606,663 B2 | 10/2009 | Neef et al. | |
| 7,634,403 B2* | 12/2009 | Roth | G10L 15/22 704/235 |
| 7,634,718 B2* | 12/2009 | Nakajima | G06F 3/04883 715/200 |
| 7,706,616 B2* | 4/2010 | Kristensson | G06K 9/222 382/187 |
| 7,729,916 B2* | 6/2010 | Coffman | G06F 17/30899 704/270 |
| 7,805,302 B2* | 9/2010 | Chelba | G06F 17/271 704/255 |
| 7,831,426 B2* | 11/2010 | Bennett | G06F 17/27 704/252 |
| 7,934,656 B2 | 5/2011 | Silverbrook et al. | |
| 8,060,298 B2 | 11/2011 | Cheung et al. | |
| 8,196,055 B2* | 6/2012 | Zotov | G06F 3/04883 715/764 |
| 8,200,429 B2 | 6/2012 | Sasano | |
| 8,224,650 B2* | 7/2012 | Galanes | H04M 1/72561 704/270.1 |
| 8,243,060 B2 | 8/2012 | Stitt et al. | |
| 8,362,926 B2 | 1/2013 | Kim et al. | |
| 8,447,066 B2* | 5/2013 | King | G06K 9/228 382/100 |
| 8,464,278 B2* | 6/2013 | Nesamoney | G06Q 10/06 719/318 |
| 8,478,516 B2 | 7/2013 | Tanioka et al. | |
| 8,487,879 B2* | 7/2013 | Kim | G06F 40/171 345/173 |
| 8,498,870 B2 | 7/2013 | Brandt | 704/270.1 |
| 8,589,911 B1* | 11/2013 | Sharkey | G06F 8/61 717/173 |
| 8,660,849 B2* | 2/2014 | Gruber | G06F 17/3087 704/275 |
| 8,670,925 B2 | 3/2014 | Gluck | |
| 8,706,503 B2* | 4/2014 | Cheyer | G06F 17/3087 704/275 |
| 8,713,119 B2 | 4/2014 | Lindahl | |
| 8,751,155 B2 | 6/2014 | Lee | |
| 8,907,956 B2 | 12/2014 | Cao | |
| 8,938,359 B1 | 1/2015 | Dorfman | |
| 8,942,986 B2* | 1/2015 | Cheyer | G06F 17/3087 704/275 |
| 9,036,509 B1 | 5/2015 | Addepalli et al. | |
| 9,111,380 B2 | 8/2015 | Piemonte et al. | |
| 9,182,905 B2* | 11/2015 | Lee | G06F 3/04883 |
| 9,201,520 B2* | 12/2015 | Benko | G06F 3/03545 |
| 9,274,704 B2* | 3/2016 | Hirabayashi | G06K 9/00436 |
| 9,311,750 B2 | 4/2016 | Moore et al. | |
| 9,318,108 B2 | 4/2016 | Gruber et al. | |
| 9,330,720 B2 | 5/2016 | Lee | |
| 9,417,083 B2 | 8/2016 | Yamaguchi | |
| 9,429,435 B2 | 8/2016 | Blumenberg et al. | |
| 9,430,463 B2* | 8/2016 | Futrell | G06F 40/194 |
| 9,530,318 B1 | 12/2016 | Turner et al. | |
| 9,569,101 B2* | 2/2017 | Kim | G06F 3/04883 |
| 9,626,955 B2 | 4/2017 | Fleizach et al. | |
| RE46,548 E * | 9/2017 | Williams | |
| 9,761,220 B2* | 9/2017 | Levit | G10L 15/063 |
| 9,799,225 B2 | 10/2017 | Lueck et al. | |
| 10,019,994 B2 | 7/2018 | Keen | |
| 2001/0034588 A1 | 10/2001 | Agrawals et al. | |
| 2001/0035880 A1 | 11/2001 | Musatov et al. | |
| 2002/0150297 A1 | 10/2002 | Gorbatov et al. | |
| 2002/0177944 A1 | 11/2002 | Ihara et al. | |
| 2002/0194213 A1 | 12/2002 | Takayanagi | |
| 2003/0011638 A1 | 1/2003 | Chung | |
| 2003/0046072 A1* | 3/2003 | Ramaswamy | G06F 17/2881 704/240 |
| 2003/0046087 A1 | 3/2003 | Johnston et al. | |
| 2003/0046401 A1* | 3/2003 | Abbott | G06F 9/451 709/228 |
| 2003/0093419 A1 | 5/2003 | Bangalore et al. | |
| 2003/0154024 A1 | 8/2003 | Klein et al. | |
| 2003/0158796 A1 | 8/2003 | Balent | |
| 2003/0216905 A1* | 11/2003 | Chelba | G06F 17/271 704/9 |
| 2003/0225825 A1* | 12/2003 | Healey | G06F 8/00 709/203 |
| 2004/0003142 A1* | 1/2004 | Yokota | G06F 3/04883 710/1 |
| 2004/0021700 A1* | 2/2004 | Iwema | G06K 9/033 715/863 |
| 2004/0075695 A1 | 4/2004 | Chew et al. | |
| 2004/0119754 A1 | 6/2004 | Bangalore et al. | |
| 2004/0148170 A1* | 7/2004 | Acero | G06F 40/216 704/257 |
| 2004/0172191 A1 | 9/2004 | Vitikainen et al. | |
| 2004/0213461 A1 | 10/2004 | Goldfoot | |
| 2004/0240739 A1* | 12/2004 | Chang | G06F 3/04883 382/186 |
| 2004/0267528 A9* | 12/2004 | Roth | G10L 15/19 704/251 |
| 2005/0033582 A1* | 2/2005 | Gadd | G06Q 30/02 704/277 |
| 2005/0091059 A1* | 4/2005 | Lecoeuche | H04M 1/72561 704/270.1 |
| 2005/0096913 A1 | 5/2005 | Coffman et al. | |
| 2005/0124322 A1 | 6/2005 | Hennecke | |
| 2005/0131633 A1 | 6/2005 | Lapstun et al. | |
| 2005/0137791 A1 | 6/2005 | Agrawala et al. | |
| 2005/0159948 A1* | 7/2005 | Roth | G10L 15/22 704/233 |
| 2005/0182604 A1 | 8/2005 | Agrawala et al. | |
| 2005/0244058 A1 | 11/2005 | Gorbatov et al. | |
| 2006/0089794 A1 | 4/2006 | Depasqua | |
| 2006/0092138 A1* | 5/2006 | Kim | G06F 3/04842 345/173 |
| 2006/0114239 A1* | 6/2006 | Nakajima | G06F 3/04883 345/173 |
| 2006/0129944 A1* | 6/2006 | Berquist | G06T 3/00 715/764 |
| 2006/0182345 A1* | 8/2006 | Geidl | G07C 9/37 382/188 |
| 2006/0190256 A1* | 8/2006 | Stephanick | G06F 17/2735 704/252 |
| 2006/0276959 A1 | 12/2006 | Matsuoka et al. | |
| 2007/0036346 A1* | 2/2007 | Kwon | G06F 3/0482 379/413 |
| 2007/0043574 A1* | 2/2007 | Coffman | G10L 15/22 704/275 |
| 2007/0150173 A1 | 6/2007 | Neef et al. | |

(56) References Cited

U.S. PATENT DOCUMENTS

| | | | |
|---|---|---|---|
| 2007/0225969 A1* | 9/2007 | Coffman | G06F 17/2818 704/9 |
| 2007/0275700 A1 | 11/2007 | Agrawal et al. | |
| 2008/0034032 A1* | 2/2008 | Healey | G06F 8/00 709/203 |
| 2008/0174568 A1* | 7/2008 | Kim | G06F 3/04886 345/173 |
| 2008/0228496 A1* | 9/2008 | Yu | G06F 3/038 704/275 |
| 2008/0281712 A1 | 11/2008 | Fuzell-Casey et al. | |
| 2009/0031327 A1* | 1/2009 | Nesamoney | G06Q 10/06 719/318 |
| 2009/0132480 A1 | 5/2009 | Liron | |
| 2009/0177376 A1 | 7/2009 | Mo et al. | |
| 2009/0187407 A1* | 7/2009 | Soble | G10L 13/00 704/260 |
| 2009/0214117 A1* | 8/2009 | Ma | G06K 9/00409 382/187 |
| 2010/0007664 A1 | 1/2010 | Cao | |
| 2010/0026642 A1* | 2/2010 | Kim | G06F 3/0416 345/173 |
| 2010/0076989 A1 | 3/2010 | Jakobson | |
| 2010/0082232 A1 | 4/2010 | Lee | |
| 2010/0083162 A1* | 4/2010 | Hernandez | G06F 1/1647 715/776 |
| 2010/0169841 A1* | 7/2010 | Singh | G06F 3/04883 715/863 |
| 2010/0198489 A1 | 8/2010 | Rozovski et al. | |
| 2010/0235726 A1 | 9/2010 | Ording et al. | |
| 2010/0235734 A1* | 9/2010 | Ording | G06F 3/04886 715/702 |
| 2010/0262591 A1* | 10/2010 | Lee | G06F 3/04842 707/706 |
| 2010/0281435 A1* | 11/2010 | Bangalore | G06F 3/038 715/863 |
| 2011/0004821 A1 | 1/2011 | Miyazawa et al. | |
| 2011/0024492 A1 | 2/2011 | Silverbrook et al. | |
| 2011/0202864 A1* | 8/2011 | Hirsch | G06F 3/0482 715/773 |
| 2011/0224896 A1 | 9/2011 | Napieraj | |
| 2011/0225232 A1* | 9/2011 | Casalaina | G06F 3/0481 709/203 |
| 2011/0228322 A1 | 9/2011 | Ashikawa et al. | |
| 2011/0265035 A1* | 10/2011 | Lepage | G06F 3/0482 715/810 |
| 2012/0005619 A1* | 1/2012 | Jung | G06F 9/451 715/780 |
| 2012/0019487 A1* | 1/2012 | Kazamaki | G06F 40/242 345/179 |
| 2012/0064947 A1* | 3/2012 | Yi | G06F 3/0483 455/566 |
| 2012/0078611 A1 | 3/2012 | Soltani et al. | |
| 2012/0083294 A1 | 4/2012 | Bray et al. | |
| 2012/0092266 A1 | 4/2012 | Akella | |
| 2012/0192250 A1* | 7/2012 | Rakan | G06F 3/03545 726/2 |
| 2012/0302167 A1* | 11/2012 | Yun | G06F 3/0416 455/41.2 |
| 2013/0096819 A1 | 4/2013 | Tarnok | |
| 2013/0110519 A1* | 5/2013 | Cheyer | G06F 17/3087 704/275 |
| 2013/0110520 A1* | 5/2013 | Cheyer | G06F 17/3087 704/275 |
| 2013/0115972 A1 | 5/2013 | Ziskind et al. | |
| 2013/0138521 A1 | 5/2013 | Want et al. | |
| 2013/0173720 A1* | 7/2013 | Vasudev | H04L 51/18 709/206 |
| 2013/0219014 A1 | 8/2013 | Yerli | |
| 2013/0297206 A1 | 11/2013 | Heng et al. | |
| 2013/0321402 A1 | 12/2013 | Moore et al. | |
| 2013/0322702 A1 | 12/2013 | Piemonte et al. | |
| 2013/0339891 A1 | 12/2013 | Blumenberg et al. | |
| 2013/0344905 A1 | 12/2013 | Kim et al. | |
| 2013/0346873 A1* | 12/2013 | Vasudev | G06F 40/14 715/738 |
| 2013/0346924 A1 | 12/2013 | Morrill et al. | |
| 2014/0006631 A1 | 1/2014 | Meskauskas et al. | |
| 2014/0032597 A1* | 1/2014 | Ellis | G06F 16/95 707/770 |
| 2014/0032713 A1* | 1/2014 | Phan | H04L 67/16 709/217 |
| 2014/0033076 A1* | 1/2014 | Al-Alami | G06F 3/0483 715/753 |
| 2014/0156277 A1* | 6/2014 | Fujii | G10L 15/26 704/251 |
| 2014/0229101 A1 | 8/2014 | Glaser et al. | |
| 2014/0297178 A1 | 10/2014 | Luan et al. | |
| 2014/0307863 A1* | 10/2014 | Snyder | H04M 3/42068 379/265.09 |
| 2014/0310608 A1* | 10/2014 | Snyder | G06Q 10/109 715/738 |
| 2015/0006078 A1 | 1/2015 | Dorfmann | |
| 2015/0035765 A1* | 2/2015 | Hirabayashi | G06K 9/00436 345/173 |
| 2015/0051835 A1 | 2/2015 | Jung et al. | |
| 2015/0052080 A1 | 2/2015 | Letzeiser | |
| 2015/0189525 A1 | 7/2015 | Schmidt et al. | |
| 2015/0286943 A1* | 10/2015 | Wang | G06F 3/04842 706/11 |
| 2015/0323339 A1 | 11/2015 | Yamaguchi | |
| 2015/0331549 A1 | 11/2015 | Legris et al. | |
| 2016/0209230 A1 | 7/2016 | Nagy et al. | |
| 2016/0321950 A1 | 11/2016 | McQuistan et al. | |
| 2016/0329117 A1 | 11/2016 | Noda et al. | |
| 2016/0336006 A1* | 11/2016 | Levit | G10L 15/063 |
| 2017/0270912 A1* | 9/2017 | Levit | G10L 15/063 |
| 2017/0337261 A1* | 11/2017 | Wang | G06F 17/2785 |
| 2018/0038710 A1 | 2/2018 | Shang | |
| 2018/0080782 A1 | 3/2018 | Noda et al. | |
| 2018/0164117 A1 | 6/2018 | Sakaguchi et al. | |
| 2018/0202811 A1 | 7/2018 | Bostick et al. | |
| 2018/0267942 A1 | 9/2018 | Zhi et al. | |
| 2018/0341835 A1 | 11/2018 | Siminoff | |
| 2019/0077458 A1 | 3/2019 | Khlifi | |

FOREIGN PATENT DOCUMENTS

| | | |
|---|---|---|
| KR | 10-2011-0012217 A | 2/2011 |
| KR | 10-2011-0127752 A | 11/2011 |
| KR | 10-2011-0127894 A | 11/2011 |

OTHER PUBLICATIONS

Freeman ("MyScript Memo Lets You Take and Send Handwritten Notes" from "https://appadvice.com/appnn/2012/02/myscript-memo-lets-you-take-and-send-handwritten-notes"; pub date: Feb. 1, 2012; last accessed Sep. 27, 2018) (hereinafter MyScriptMemo).*

Korean Office Action with English translation dated Mar. 21, 2019; Korean Appln. No. 10-2012-0095950.

USPTO office action dated Sep. 23, 2019; U.S. Appl. No. 16/109,024.

Korean Office Action dated Sep. 30, 2019; Application #: 10-2012-0095950.

European Office Action dated Aug. 5, 2019; Reference#: P221565EPD1; Application #:/Patent No#: 19164183.6-1231.

U.S. Office Action dated Jul. 27, 2020; U.S. Appl. No. 16/109,024.

* cited by examiner

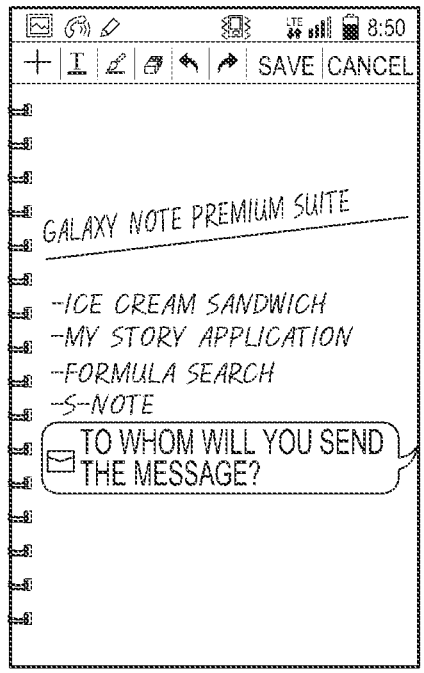 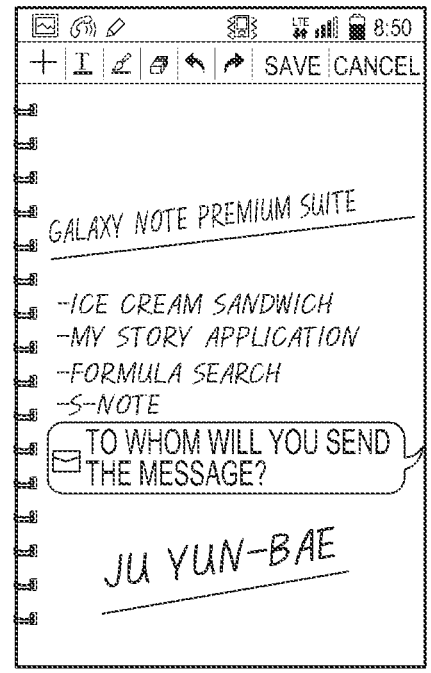
FIG.29A  FIG.29B
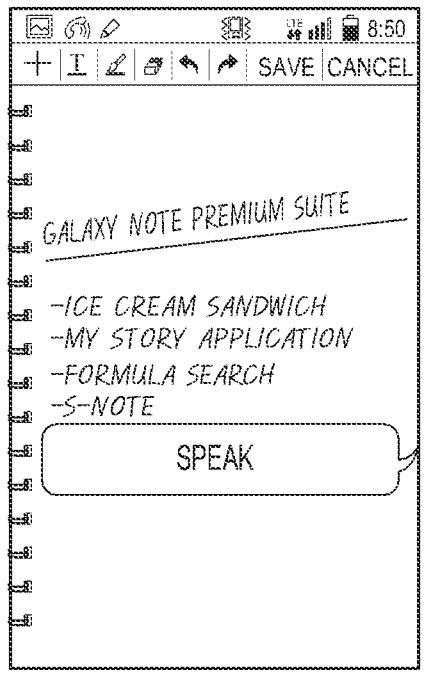 
FIG.30A  FIG.30B

USER INTERFACE APPARATUS IN A USER TERMINAL AND METHOD FOR SUPPORTING A MEMO FUNCTION

CROSS-REFERENCE TO RELATED APPLICATION(S)

This application claims the benefit under 35 U.S.C. § 119(a) of a Korean patent application filed on Aug. 30, 2012 in the Korean Intellectual Property Office and assigned Serial No. 10-2012-0095950, the entire disclosure of which is hereby incorporated by reference.

TECHNICAL FIELD

The present disclosure relates to a user interface apparatus in a user terminal and a method for supporting the same. More particularly, the present disclosure relates to a hybrid user interface apparatus supporting both handwriting and speech in a user terminal and a method for supporting the same.

BACKGROUND

Along with the recent growth of portable electronic devices, user demands for User Interfaces (UIs) that enable intuitive input/output have increased. For example, traditional UI schemes using an additional device, such as a keyboard, a keypad, a mouse, or the like, for inputting information have gradually evolved to intuitive UI schemes for inputting information by directly touching a screen with a finger, with a touch electronic pen or by voice.

The development trend of the UI technology is toward intuitive and human-centered technologies, as well as those for increased user convenience. In available UI technology applications, a user can have a dialog with a portable electronic device and input or acquire intended information based on the dialog.

Typically, various applications are installed on, and new functions are available through the installed applications in, common portable electronic devices, e.g., smart phones.

However, the installed applications are usually executed independently in a smart phone, and thus new functions or application results are not provided through an interworking between the various applications.

For example, even though a user terminal may support an intuitive UI in a scheduler application, a user can input information only through a UI supported by the scheduler application.

Moreover, in the case of a user terminal supporting a memo function by means of a touch screen, a user simply takes a note using an input means such as a finger, an electronic pen, or the like; there exists no specified method for using the contents of the note in conjunction with other applications.

Thus, even though a user terminal may support various intuitive UIs, there is no specific method for enabling the user to readily select and use any of the intuitive UIs from any other application.

Therefore, a need exists for a method and an apparatus for a hybrid user interface in a user terminal that supports both handwriting and speech.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the problems and/or disadvantages and to provide at least the advantages described below. Accordingly, an aspect of the present disclosure is to provide an apparatus and method for exchanging information with a user by means of a handwriting-based User Interface (UI) in a user terminal.

Another aspect of the present disclosure is to provide a UI apparatus for executing a specific command using a handwriting-based memo function in a user terminal and a method for supporting the same.

Another aspect of the present disclosure is to provide a UI apparatus for exchanging questions and answers using a handwriting-based memo function in a user terminal and a method for supporting the same.

Another aspect of the present disclosure is to provide a UI apparatus for performing a question and answer procedure with a user by handwriting and speech in a user terminal and a method for supporting the same.

Another aspect of the present disclosure is to provide a UI apparatus and method for receiving a command to process a selected whole or a part of a note displayed on a screen using a memo function in a user terminal.

Another aspect of the present disclosure is to provide a UI apparatus and method for supporting switching between memo mode and command processing mode in a user terminal supporting a memo function through an electronic pen.

Another aspect of the present disclosure is to provide a UI apparatus and method for enabling a user to input a command for controlling a specific application or another application during execution of the specific application in progress in a user terminal.

Another aspect of the present disclosure is to provide a UI apparatus and method for analyzing a user's memo pattern and determining information input by a memo function, taking into account the analyzed memo pattern in a user terminal.

Another aspect of the present disclosure is to provide a UI apparatus and method for, upon user selection of note contents, displaying menu icons for processing the user-selected note contents on a screen in a user terminal that provides a plurality of intuitive UIs.

A further aspect of the present disclosure is to provide a UI apparatus and method for supporting user-selected note contents so that a memo-based UI and a voice-based UI may be selectively used in a user terminal.

In accordance with an embodiment of the present disclosure, a UI method in a user terminal is provided. The method includes displaying, upon user selection of a whole or of part of the contents of a note displayed on a screen, menu icons for processing the selected contents are displayed, and processing, upon user selection of one of the displayed menu icons, the selected contents by a function corresponding to the selected menu icon.

In accordance with another embodiment of the present disclosure, a UI apparatus in a user terminal is provided. The terminal is configured to display, upon user selection of a whole or of part of the contents of a note displayed on a screen, menu icons for processing the selected contents, and process, upon user selection of one of the displayed menu icons, the selected contents by a function corresponding to the selected menu icon.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other objects, features, and advantages of certain embodiments of the present disclosure will be more apparent from the following description taken in conjunction with the accompanying drawings, in which:

FIGS. 29A and 29B illustrate an example of processing a selected menu icon corresponding to memo-based command execution in the user terminal according to an embodiment of the present disclosure;

FIGS. 30A and 30B illustrate an example of processing a selected menu icon corresponding to voice command execution in the user terminal according to an embodiment of the present disclosure.

Throughout the drawings, like reference numerals will be understood to refer to like parts, components, and structures.

DETAILED DESCRIPTION

Figure 1:
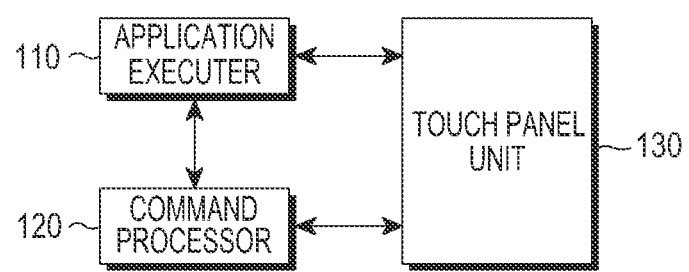
FIG. 1 is a block diagram of a user terminal for supporting handwriting-based Natural Language Interaction (NLI) according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Reference will be made to representative embodiments of the present disclosure to achieve the technical objects of the present invention. The same names as defined can be used for the same entities. However, the names do not limit the scope of the present invention and can be applied to a system having a similar technical background with the same or ready modifications to them.

Embodiments of the present disclosure, which will be described later, are intended to apply a handwriting-based User Interface (UI) technology as Natural Language Interaction (NLI) (hereinafter, referred to as 'handwriting-based NLI') to a user terminal and thus enable a question and answer procedure with a user by a memo function in the user terminal.

NLI generally involves understanding and creation. With the understanding and creation functions, an input is understood and text readily understandable to humans is displayed. Thus, it can be said that NLI is an application that enables a dialogue in a natural language between a human being and an electronic device.

In embodiments, a user terminal executes a command received from a user or acquires information required to execute the input command from the user in a question and answer procedure through NLI.

However, the question and answer procedure is not necessarily based on the memo function in the present disclosure. That is, the question and answer procedure is not limited to questions and answers exchanged between a user and a user terminal only by the memo function.

In embodiments, the user terminal may ask a question by voice, and the user may answer the question by handwriting, or vice versa. In addition, the user may ask a question by voice and the user terminal may answer the question by handwriting, or vice versa.

In embodiments, the user terminal may ask the user questions by handwriting and voice, or may answer the user's questions by handwriting and voice.

Information input/output between the user and the user terminal by voice and handwriting is referred to as 'hybrid NLI'.

As described before, an Intuitive UI used for a question and answer procedure between the user and the user terminal may be set and changed in the user terminal by the user. The following description will be given mainly in the context of a handwriting-based question and answer procedure. However, it is to be understood that the present disclosure is not limited to the handwriting-based question and answer procedure.

To apply handwriting-based NLI to the user terminal, switching should be performed organically between memo mode and command processing mode through handwriting-based NLI in the present disclosure. The memo mode includes a state in which the user terminal supports writing a note on a screen displayed by an activated application with an input means, such as a finger or an electronic pen, whereas the command processing mode supports processing the note received in the memo mode in conjunction with information associated with the currently activated application.

In embodiments, switching may occur between the memo mode and the command processing mode by pressing a button of an electronic pen, that is, by generating a signal in hardware.

While the following description is given in the context of an electronic pen being used as a major input means to support a memo function, the present disclosure is not limited to a user terminal using an electronic pen as an input means. In other words, it is to be understood that any means of inputting information on a touch panel can be used as an input means in embodiments of the present disclosure.

In embodiments, information is shared between the user terminal and the user such that the user terminal may receive intended information from the user by exchanging a question and an answer with the user and thus may provide the result of processing the received information to the user through the handwriting-based NLI technology of the present disclosure. In embodiments, it may be agreed that in order to request operation mode switching, at least one of a symbol, a pattern, text, or a combination thereof is used, or a gesture is used by a gesture recognition function. In embodiments, memo mode to command processing mode switching or command processing mode to memo mode switching may be requested.

In regard to agreement on input information corresponding to a symbol, a pattern, text, or a combination of them, it is optional to analyze the user's memo pattern and consider the analysis result, thereby enabling the user to intuitively input intended information with convenience.

Various scenarios of controlling a currently activated application by a memo function based on handwriting-based NLI and outputting a control result will be described in detail as separate embodiments of the present disclosure.

In embodiments, a detailed description will be given of a scenario of selecting a whole or part of the contents of a note and processing the selected note contents according to a specific command, a scenario of inputting specific information to a screen of a specific application by a memo function, a scenario of processing a specific command in a question and answer procedure using handwriting-based NLI, or the like.

Reference will be made to embodiments of the present disclosure with reference to the attached drawings. A detailed description of generally known functions and structures of the present disclosure will be avoided lest it should obscure the subject matter of the present disclosure.

FIG. 1 is a block diagram of a user terminal supporting handwriting-based NLI according to an embodiment of the present disclosure. While only components of the user terminal required to support handwriting-based NLI according to an embodiment of the present disclosure are shown in FIG. 1, it is obvious that components may be added to the user terminal in order to perform other functions. It is also possible to configure each component illustrated in FIG. 1 in the form of a software function block as well as a hardware function block.

Referring to FIG. 1, upon user request, an application executer 110 installs an application received through a network or an external interface in conjunction with a memory (not shown). The application executer 110 activates one (or more) of the installed applications upon a user request, and controls the activated application according to an external command. The external command refers to almost any externally input command as opposed to internally generated commands.

In embodiments, the external command may be a command corresponding to information input through handwriting-based NLI by the user as well as a command corresponding to information input through a network. That is, the external command is not limited to a command corresponding to information input through handwriting-based NLI by a user, which should not be construed as limiting the present disclosure.

The application executer 110 provides the result of installing or activating a specific application to the user through handwriting-based NLI. In embodiments, the application executer 110 outputs the result of installing or activating a specific application on a display of a touch panel unit 130.

The touch panel unit 130 processes information input/output through handwriting-based NLI. The touch panel unit 130 performs a display function and an input function. The display function generically refers to a function of displaying information on a screen and the input function generically refers to a function of receiving information from a user.

In embodiments, the user terminal may include an additional structure for performing the display function and the input function. In embodiments, the user terminal may further include a camera for sensing a gesture.

The following description will be given with the understanding that the touch panel unit 130 performs both the display function and the input function without its operation being separated into the display function and the input function.

The touch panel unit 130 recognizes specific information or a specific command received from the user and provides the recognized information or command to the application executer 110 and/or a command processor 120.

The information may be information about a note written by the user or information about an answer in a question and answer procedure based on handwriting-based NLI. In embodiments, the information may be information for selecting the whole, or a part, of the contents of a note displayed on a current screen.

The command may be a command requesting installation of a specific application or a command requesting activation of a specific application from among already installed applications. In embodiments, the command may be a command requesting the execution of a specific operation, function, etc. supported by a selected application.

The information or command may be input in the form of a line, a symbol, a pattern, or a combination thereof, as well as in text. Such a line, a symbol, a pattern, or the like, may be preset by an agreement or by a learning function.

The touch panel unit 130 displays the result of activating a specific application or performing a specific function of the activated application by the application executer 110 on a screen.

The touch panel unit 130 also displays a question or a result on a screen in a question and answer procedure. In embodiments, when the user inputs a specific command, the touch panel unit 130 may display the result of processing the specific command received from the command processor 120, or may display a question to acquire additional information required to process the specific command. Upon receipt of the additional information as an answer to the question from the user, the touch panel unit 130 provides the received additional information to the command processor 120.

Subsequently, the touch panel unit 130 displays an additional question to acquire other information upon request of the command processor 120 or the result of processing the specific command, reflecting the received additional information.

The command processor 120 may receive a user-input text, a symbol, a figure, a pattern, or the like, from the touch panel unit 130, and may identify a user-intended input by the text, the symbol, the figure, the pattern, or the like.

In embodiments, the command processor 120 may recognize the user-intended input by natural language processing of the received text, symbol, figure, pattern, or the like. For the natural language processing, the command processor 120 employs handwriting-based NLI. The user-intended input includes a command requesting activation of a specific application or execution of a specific function in a current active application, or an answer to a question.

When the command processor 120 determines that the user-intended input is a command requesting a certain operation, the command processor 120 processes the determined command. In embodiments, the command processor 120 commands the application executer 110 to activate a specific application or to execute a specific function of a current active application, according to the processed command. In this case, the command processor 120 receives a processed result from the application executer 110 and provides the processed result to the touch panel unit 130.

The application executer 110 may provide the processed result directly to the touch panel unit 130, without making the processed result pass through the command processor 120.

If additional information is needed to process the determined command, the command processor 120 may create a question to acquire the additional information and may provide the question to the touch panel unit 130. Then the command processor 120 may receive an answer to the question from the touch panel unit 130.

The command processor 120 may continuously exchange questions and answers with the user, that is, may continue a dialogue with the user through the touch panel unit 130 until acquiring sufficient information to process the determined command. That is, the command processor 120 may repeat the question and answer procedure through the touch panel unit 130.

To perform the above-described operation, the command processor 120 adopts handwriting-based NLI by interworking with the touch panel unit 130. That is, the command processor 120 enables questions and answers, that is, a dialogue between a user and an electronic device, by using a memo function and a handwriting-based natural language interface. The user terminal may process a user command or provide the result of processing the user command to the user in the dialogue.

Figure 2:
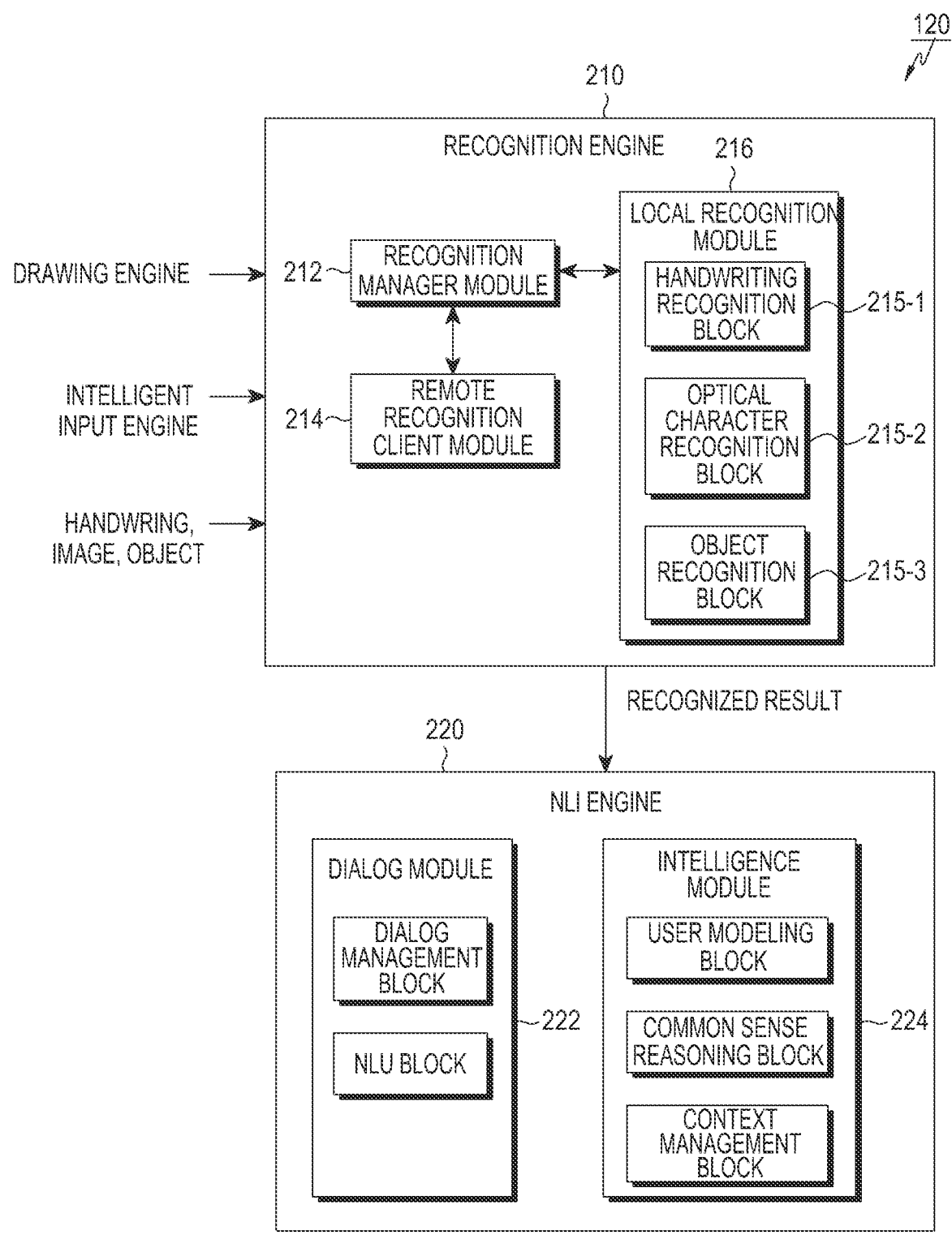
FIG. 2 is a block diagram of a command processor for supporting handwriting-based NLI in the user terminal according to an embodiment of the present disclosure.

FIG. 2 is a block diagram of a command processor for supporting handwriting-based NLI in the user terminal according to an embodiment of the present disclosure.

Referring to FIG. 2, the command processor 120 supporting handwriting-based NLI includes a recognition engine 210 and an NLI engine 220.

The recognition engine 210 includes a recognition manager module 212, a remote recognition client module 214, and a local recognition module 216. The local recognition module 216 includes a handwriting recognition block 215-1, an optical character recognition block 215-2, and an object recognition block 215-3.

The NLI engine 220 includes a dialog module 222 and an intelligence module 224. The dialog module 222 includes a dialog management block for controlling a dialog flow and a Natural Language Understanding (NLU) block for recognizing a user's intention. The intelligence module 224 includes a user modeling block for reflecting user preferences, a common sense reasoning block for reflecting common sense, and a context management block for reflecting a user context.

The recognition engine 210 may receive information, a handwriting image, an object, or the like, from a drawing engine corresponding to an input means, such as an electronic pen, or from an intelligent input platform, such as a camera. The information received at the recognition engine 210 may take the form of text, a line, a symbol, a pattern, or a combination thereof.

The recognition engine 210 may recognize note contents included in a user-selected area of a currently displayed note or in a user-indicated command from text, a line, a symbol, a pattern, a figure, or a combination thereof received as the information. The recognition engine 210 outputs a recognized result obtained in the above operation.

In embodiments, the recognition engine 210 includes the recognition manager module 212 for providing overall control to output a recognized result of input information, the remote recognition client module 214, and the local recognition module 216 for recognizing the input information. The local recognition module 216 includes at least the handwriting recognition block 215-1 for recognizing handwritten input information, the optical character recognition block 215-2 for recognizing information from an input optical signal, or the object recognition block 215-3 for recognizing information from an input gesture.

Recognized results output from the handwriting recognition block, the optical character recognition block, and the object recognition block are provided to the NLI engine 220.

The NLI engine 220 determines the intention of the user by processing the recognized results received from the recognition engine 210. That is, the NLI engine 220 determines user-intended input information from the recognized results received from the recognition engine 210. Specifically, the NLI engine 220 collects sufficient information by exchanging questions and answers with the user based on handwriting-based NLI, and determines the intention of the user based on the collected information.

For this operation, the dialog module 222 of the NLI engine 220 creates a question to make a dialog with the user, and provides the question to the user, thereby controlling a dialog flow to receive an answer from the user. The dialog module 222 manages information acquired from questions and answers (i.e., the dialog management block). The dialog module 222 also understands the intention of the user by performing a natural language process on an initially received command, taking into account the managed information (i.e., the NLU block).

The intelligence module 224 of the NLI engine 220 generates information to be referred to for understanding the intention of the user through the natural language process and provides the reference information to the dialog module 222. In embodiments, the intelligence module 224 models information reflecting a user preference by analyzing a user's habit in making a note (i.e., the user modeling block), induces information for reflecting common sense (i.e., the common sense reasoning block), or manages information representing a current user context (i.e., the context management block).

Therefore, the dialog module 222 of the NLI engine 220 may control a dialog flow in a question and answer procedure with the user with the help of information received from the intelligence module 224.

Figure 3:
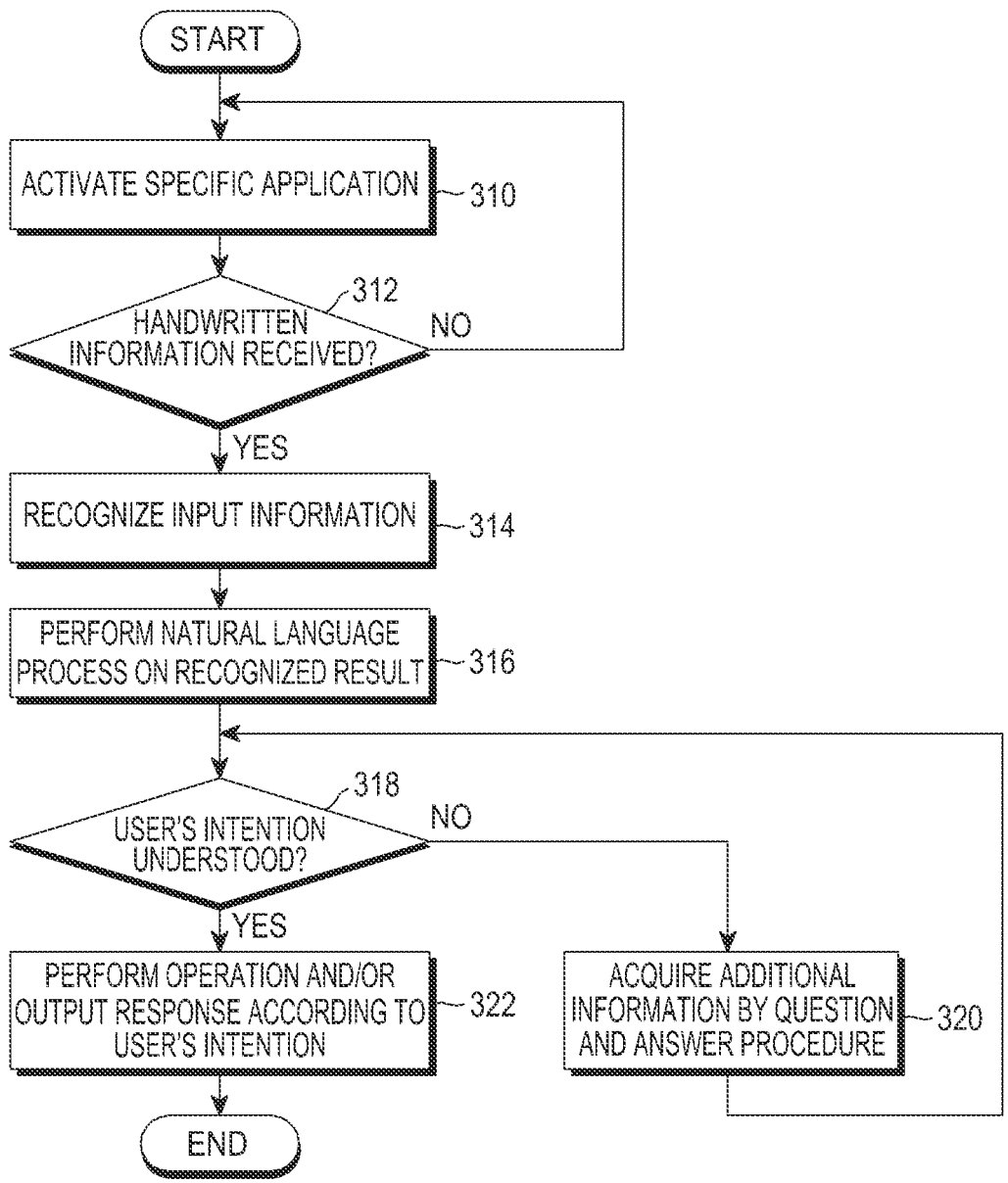
FIG. 3 is a flowchart illustrating a control operation for supporting a User Interface (UI) using handwriting-based NLI in the user terminal according to an embodiment of the present disclosure.

FIG. 3 is a flowchart illustrating a control operation for supporting a UI using handwriting-based NLI in the user terminal according to an embodiment of the present disclosure.

Referring to FIG. 3, the user terminal activates a specific application and provides a function of the activated application at operation 310. The specific application is an application of which the activation has been requested by the user from among applications installed in the user terminal.

In embodiments, the user may activate the specific application by the memo function of the user terminal. That is, the user terminal launches a memo layer on a screen, upon user request. Then, upon receipt of identification information of the specific application and information corresponding to an execution command, the user terminal searches for the specific application and activates the detected application. This method is useful for fast execution of an intended application from among a large number of applications installed in the user terminal.

The identification information of the specific application may be the name of the application, for example. The information corresponding to the execution command may be a figure, a symbol, a pattern, text, or the like, preset to command activation of the application.

Once the application has been activated at operation 310, it is determined whether a user has input handwritten information at operation 312. The application may then recognize the input information at operation 314 and perform a natural language process on the result of the recognized input information at operation 316. If it is determined that the user's intention has been understood at operation 318, a corresponding operation or output response based on the user's intention will occur at operation 322. Otherwise, the application may acquire additional information by a question and answer procedure at step 320.

Figure 4:
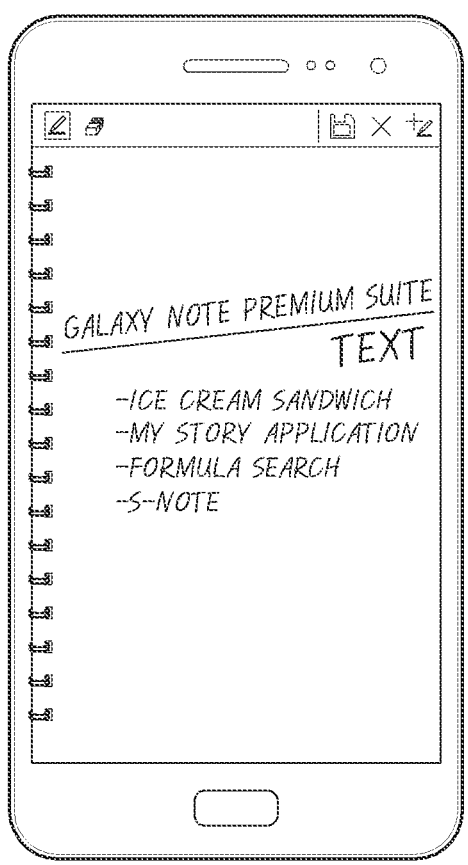
FIG. 4 illustrates an example of requesting an operation based on a specific application or function by a memo function according to an embodiment of the present disclosure.

FIG. 4 illustrates an example of requesting an operation based on a specific application or function by the memo function.

Referring to FIG. 4, a part of a note written by the memo function is selected using a line, a closed loop, or a figure and the selected note contents are processed using another application. In embodiments, note contents "galaxy note premium suite" are selected using a line and a command is issued to send the selected note contents using a text sending application.

If there is no application matching the user input in the user terminal, a candidate set of similar applications may be provided to the user so that the user may select an intended application from among the candidate applications.

In another example, a function supported by the user terminal may be executed by the memo function. For this purpose, the user terminal invokes a memo layer upon user request and searches for an installed application according to user-input information.

For instance, a search keyword is input to a memo screen displayed for the memo function in order to search for a specific application from among applications installed in the user terminal. Then the user terminal searches for the application matching the input keyword. That is, if the user writes 'car game' on the screen by the memo function, the user terminal searches for applications related to 'car game' from among the installed applications and provides the search results on the screen.

In another embodiment, the user may input an installation month, e.g., February 2011, on the screen by the memo function. Then the user terminal searches for applications installed in February 2011. That is, when the user writes 'February 2011' on the screen by the memo function, the user terminal searches for applications installed in 'February 2011' from among the installed applications and provides the search results on the screen.

As described above, in the case where a large number of applications are installed in the user terminal, activation of or search for a specific application based on a user's note may be useful.

In embodiments, for more efficient search for applications, the installed applications may be indexed. The indexed applications may be classified by categories such as feature, field, function, etc.

Upon receipt of a specific key input or a specific gesture input from the user, the memo layer may be invoked to allow the user to input identification information of an application to be activated or to input index information to search for a specific application.

Specific applications activated or searched for in the above-described manner include a memo application, a scheduler application, a map application, a music application, and a subway application.

Referring back to FIG. 3, upon activation of the specific application, the user terminal monitors input of handwritten information as was described at operation 312. The input information may take the form of a text, a line, a symbol, a pattern, or a combination of them. In embodiments, the user terminal may monitor input of information that selects a whole or part of the note written on the current screen at operation 312.

If a whole or part of the note is selected, the user terminal continuously monitors additional input of information corresponding to a command in order to process the selected note contents at operation 312.

Upon sensing input of handwritten information, the user terminal performs an operation for recognizing the sensed input information at operation 314. In embodiments, text information for the selected whole or partial note contents is recognized or input information taking the form of a line, a symbol, a pattern, or a combination thereof, as well as text is recognized. The recognition engine 210 illustrated in FIG. 2 is responsible for recognizing the input information.

Once the user terminal recognizes the sensed input information, the user terminal performs a natural language process on the recognized text information to understand the contents of the recognized text information at operation 316. The NLI engine 220 performs the natural language process on the recognized text information.

If determining that the input information is a combination of text and a symbol, the user terminal also processes the symbol along with the natural language process.

In the symbol process, the user terminal analyzes an actual memo pattern of the user and detects a main symbol that the user frequently uses by the analysis of the memo pattern. Then the user terminal analyzes the intention of using the detected main symbol and determines the meaning of the main symbol based on the analysis result.

The meaning that the user intends by each main symbol is built into a database, for later use in interpreting a later input symbol. That is, the prepared database may be used for symbol processing.

Figure 5:
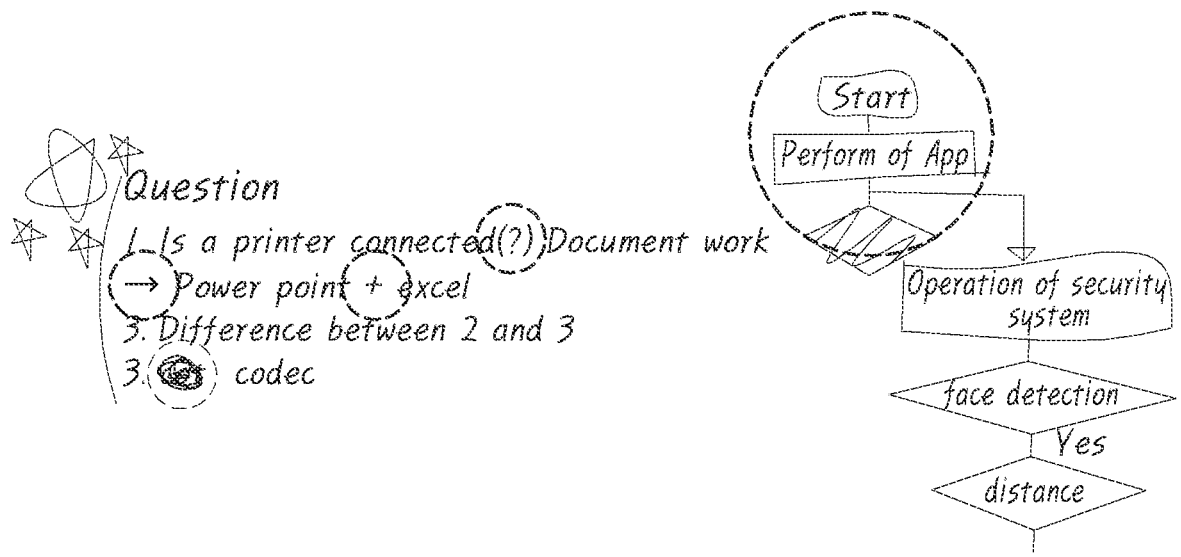
FIG. 5 illustrates an actual memo pattern of a user according to an embodiment of the present disclosure.

FIG. 5 illustrates an actual memo pattern of a user according to an embodiment of the present disclosure.

Referring to FIG. 5, the memo pattern illustrated demonstrates that the user frequently uses symbols →, ( ), _, –, +, and ?. For example, symbol → is used for additional description or paragraph separation and symbol ( ) indicates that the contents within ( ) is a definition of a term or a description.

The same symbol may be interpreted as different meanings. For example, symbol → may signify 'time passage', 'causal relationship', 'position', 'description of relationship between attributes', 'reference point for clustering', 'change', etc.

Figure 6:
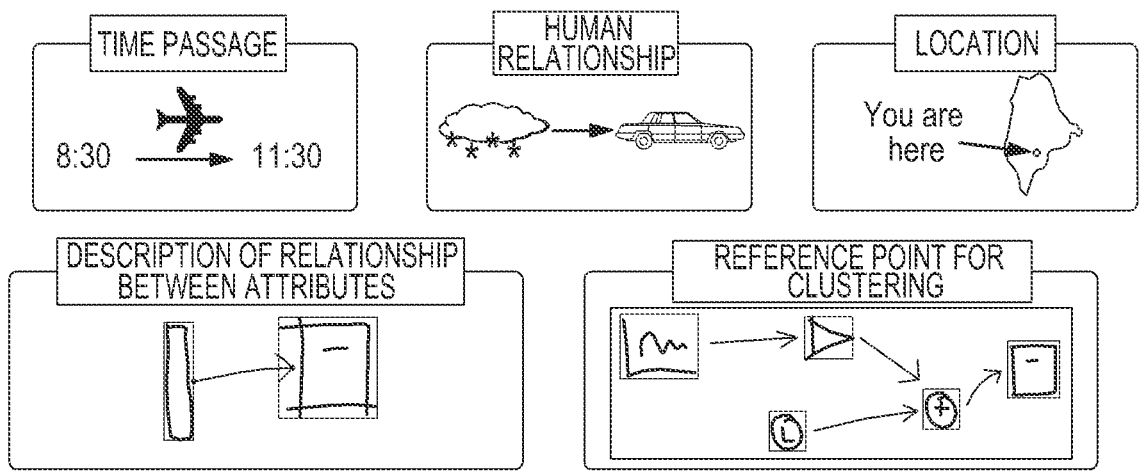
FIG. 6 illustrates an example in which one symbol may be interpreted as having various meanings according to an embodiment of the present disclosure.

FIG. 6 illustrates an example in which one symbol may be interpreted as having various meanings according to an embodiment of the present disclosure.

Referring to FIG. 6, symbol → may be used in the meanings of time passage, causal relationship, position, etc.

Figure 7:
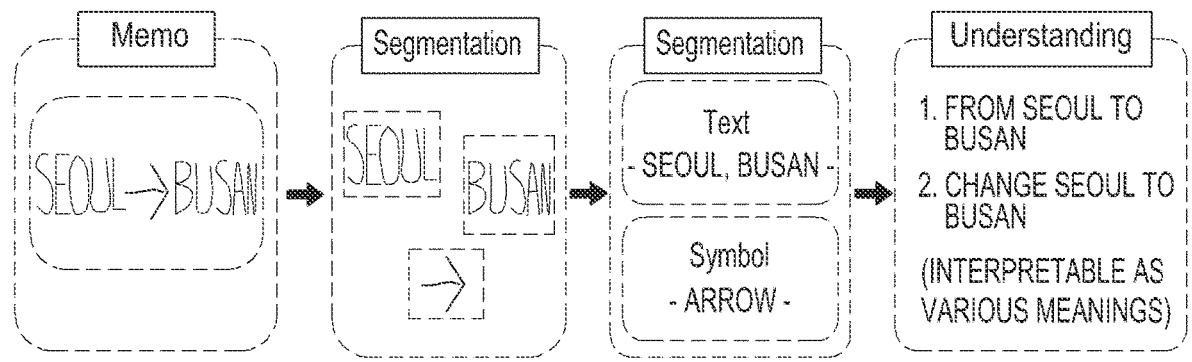
FIG. 7 illustrates an example in which input information including text and a symbol in combination may be interpreted as different meanings depending on the symbol according to an embodiment of the present disclosure.

FIG. 7 illustrates an example in which input information including a combination of text and a symbol may be interpreted as different meanings depending on the symbol according to an embodiment of the present disclosure.

Referring to FIG. 7, user-input information 'Seoul→Busan' may be interpreted to imply that 'change Seoul to Busan' as well as 'from Seoul to Busan'.

A symbol that allows a plurality of meanings may be interpreted, taking into account additional information or the relationship with previous or following information. However, this interpretation may lead to inaccurate assessment of the user's intention.

To overcome the problem, extensive research and efforts on symbol recognition/understanding are required. In embodiments, the relationship between symbol recognition and understanding is under research in semiotics of the liberal arts field and the research is utilized in advertisements, in literature, in movies, in traffic signals, and the like. Semiotics is, in its broad sense, the theory and study of functions, analysis, interpretation, meanings, and representations of signs and symbols, and various systems related to communication.

Signs and symbols are also studied from the perspective of engineering science. In embodiments, research is conducted on symbol recognition of a flowchart and a blueprint in the field of mechanical/electrical/computer engineering. The research is used in sketch (i.e., hand-drawn diagram) recognition. Further, recognition of complicated chemical structure formulas is studied in chemistry and this study is used in hand-drawn chemical diagram recognition.

Figure 8:
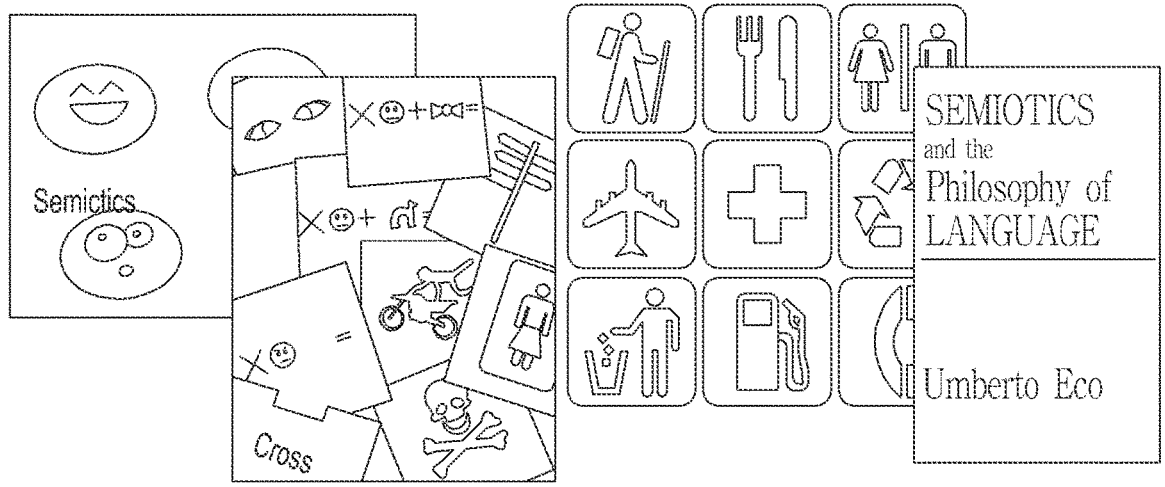
FIG. 8 illustrates examples of utilizing signs and symbols in semiotics according to an embodiment of the present disclosure.

FIG. 8 illustrates examples of utilizing signs and symbols in semiotics according to an embodiment of the present disclosure.

Figure 9:
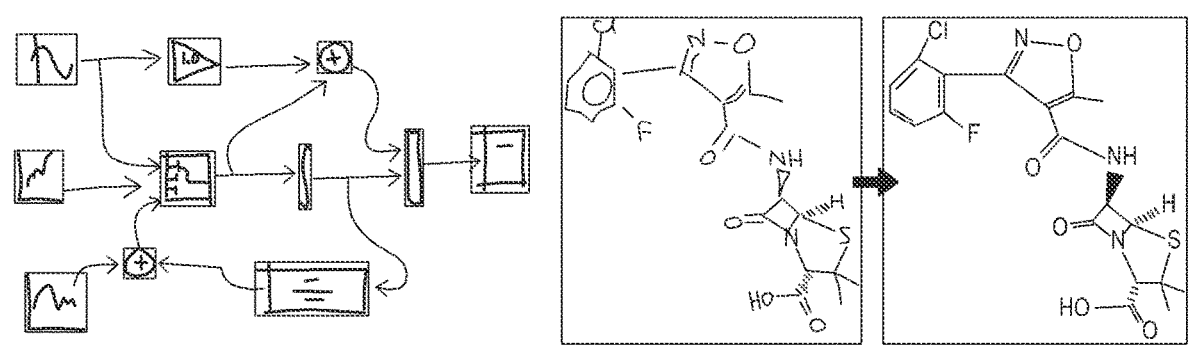
FIG. 9 illustrates examples of utilizing signs and symbols in the fields of mechanical/electrical/computer engineering and chemistry according to an embodiment of the present disclosure.

FIG. 9 illustrates examples of signs and symbols in the fields of mechanical/electrical/computer engineering and chemistry.

Referring back to FIG. 3, the user terminal understands the contents of the user-input information by the natural language process of the recognized result and then assesses the intention of the user regarding the input information based on the recognized contents at operation 318.

Once the user terminal determines the user's intention regarding the input information, the user terminal performs an operation corresponding to the user's intention or outputs a response corresponding to the user's intention at operation 322. After performing the operation corresponding to the user's intention, the user terminal may output the result of the operation to the user.

On the contrary, if the user terminal fails to assess the user's intention regarding the input information, the user terminal acquires additional information by a question and answer procedure with the user to determine the user's intention at operation 320. For this purpose, the user terminal creates a question to ask the user and provides the question to the user. When the user inputs additional information by answering the question, the user terminal re-assesses the user's intention, taking into account the new input information in addition to the contents understood previously by the natural language process at operation 318.

While not shown, the user terminal may additionally perform operations 314 and 316 to understand the new input information.

Until assessing the user's intention accurately, the user terminal may acquire most of information required to determine the user's intention by exchanging questions and answers with the user, that is, by making a dialog with the user at operation 320.

Once the user terminal determines the user's intention in the afore-described question and answer procedure, the user terminal outputs the result of an operation corresponding to the user's intention or outputs a response result corresponding to the user's intention to the user at operation 322.

The configuration of the UI apparatus in the user terminal and the UI method using handwriting-based NLI in the UI apparatus may be considered in various scenarios.

FIGS. 10, 11A, 11B, 12A, 12B, 13A, 13B, 14A, 14B, 14C, 15, 16A, 16B, and 17 illustrate operation scenarios of a UI technology according to an embodiment of the present disclosure.

Referring to FIGS. 10, 11A, 11B, 12A, 12B, 13A, 13B, 14A, 14B, 14C, 15, 16A, 16B, and 17, the figures illustrate examples of processing a note that a user has input in an application supporting the memo function by invoking another application.

Figure 10:
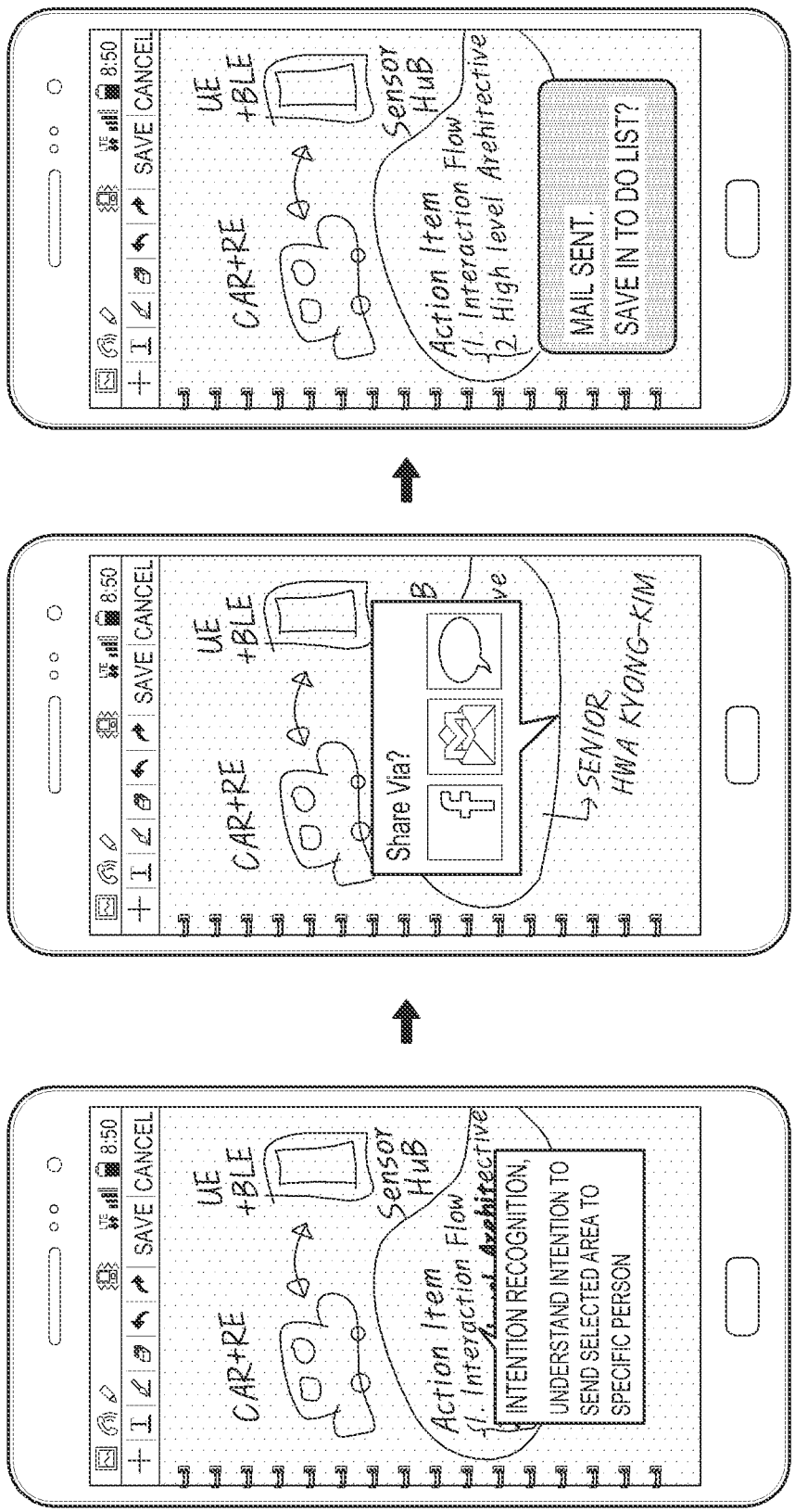
FIGS. 10, 11A, 11B, 12A, 12B, 13A, 13B, 14A, 14B, 14C, 15, 16A, 16B, and 17 illustrate operation scenarios of a UI technology according to an embodiment of the present disclosure.

Referring to FIG. 10 a scenario of sending a part of a note by mail using the memo function in the user terminal is illustrated.

In FIG. 10, the user writes a note on a screen of the user terminal by the memo function and selects a part of the note by means of a line, symbol, closed loop, etc. In embodiments, a partial area of the whole note may be selected by drawing a closed loop, thereby selecting the contents of the note within the closed loop.

Then the user inputs a command requesting processing the selected contents using a preset or intuitively recognizable symbol and text. In embodiments, the user draws an arrow indicating the selected area and writes text indicating a person (e.g., Senior, Hwa Kyong-KIM).

Upon receipt of the information, the user terminal interprets the user's intention as meaning that the note contents of the selected area are to be sent to 'Senior, Hwa Kyong-KIM'. Then the user terminal extracts recommended applications capable of sending the selected note contents from among installed applications and displays the extracted recommended applications on the screen so that the user may request selection or activation of a recommended application.

When the user selects one of the recommended applications, the user terminal invokes the selected application and sends the selected note contents to 'Senior, Hwa Kyong-KIM' by the application.

If information about the recipient is not pre-registered, the user terminal may ask the user a mail address of 'Senior, Hwa Kyong-KIM'. In this case, the user terminal may send the selected note contents in response to reception of the mail address from the user.

After processing as intended by the user, the user terminal displays the processed result on the screen so that the user may confirm appropriate processing conforming to the user's intention. In embodiments, the user terminal asks the user whether to store details of the sent mail in a list, while displaying a message indicating completion of the mail transmission. When the user requests storing of the details of the sent mail in the list, the user terminal registers the details of the sent mail in the list.

The above scenario can help to increase throughput by allowing the user terminal to send necessary contents of a note taken during a conference to the other party without the need for shifting from one application to another and store details of the sent mail through interaction with the user.

Figure 11A:
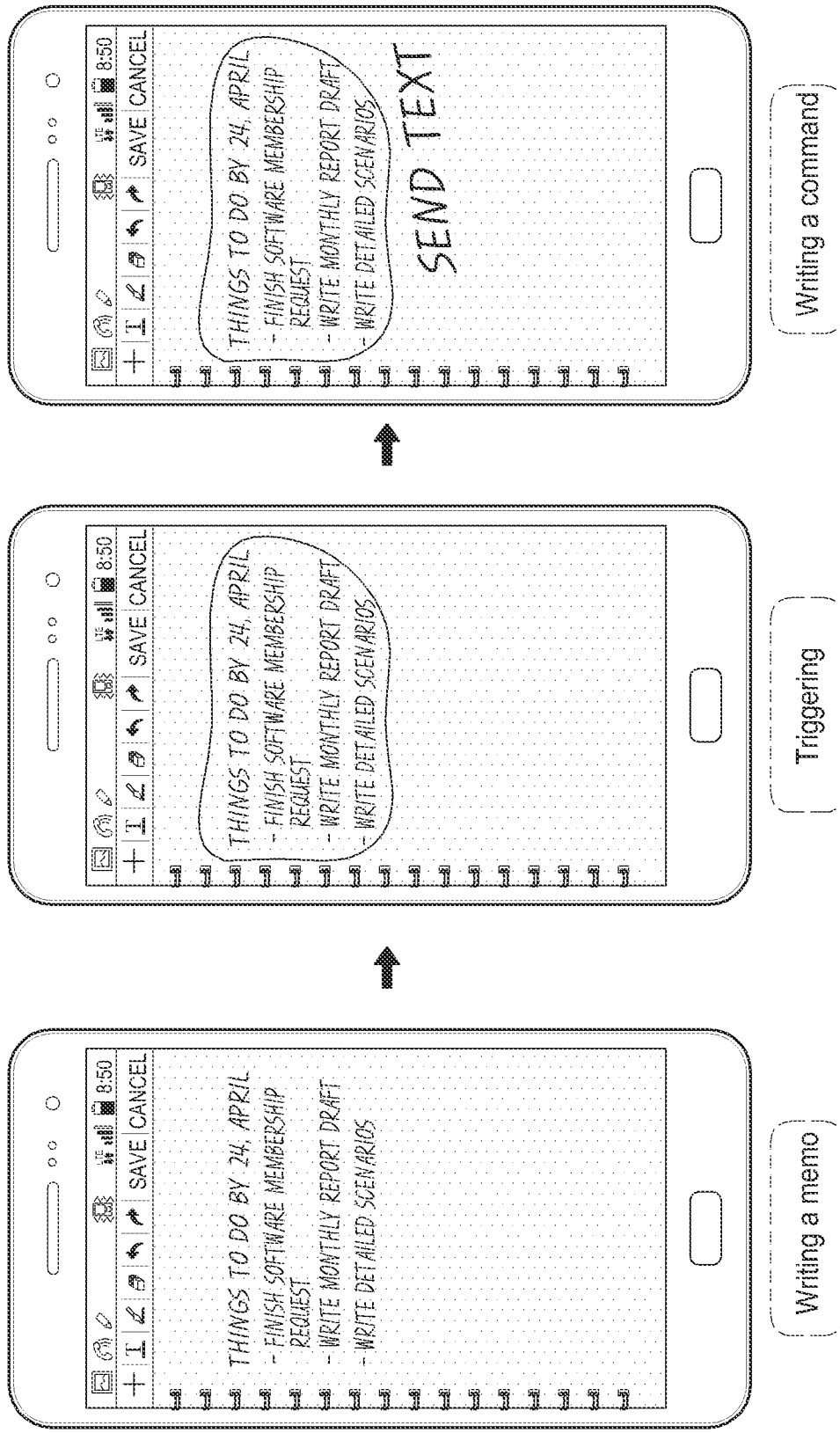
Figure 11B:
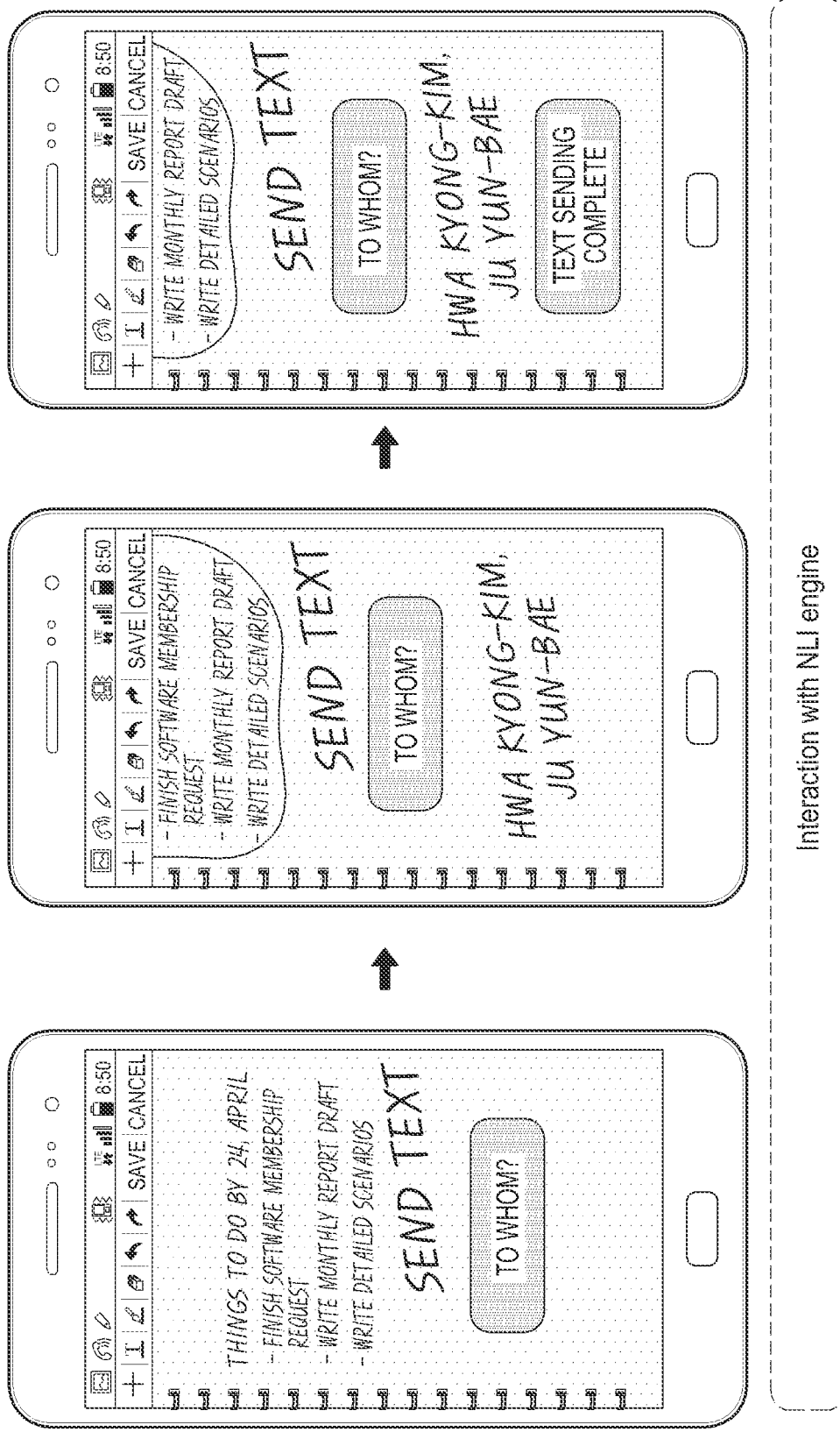

FIGS. 11A and 11B illustrate a scenario of sending a whole note by the memo function in the user terminal.

Referring to FIG. 11A, the user writes a note on a screen by the memo function (i.e., writing a memo). Then the user selects the whole note using a line, symbol, closed loop, etc. (i.e., triggering). In embodiments, when the user draws a closed loop around the entire note, the user terminal may recognize that the whole contents of the note within the closed loop are selected.

The user requests text-sending of the selected contents by writing preset or intuitively recognizable text, for example, 'send text' (i.e., writing a command).

Referring to FIG. 11B, the NLI engine that configures a UI based on user-input information recognizes that the user intends to send the contents of the selected area in text. Then the NLI engine further acquires necessary information by exchanging a question and an answer with the user, determining that information is insufficient for text sending. In embodiments, the NLI engine asks the user to whom to send the text, for example, by 'To whom?'.

The user inputs information about a recipient to receive the text by the memo function as an answer to the question. The name or phone number of the recipient may be directly input as the information about the recipient. In FIG. 11B, 'Hwa Kyong-KIM' and 'Ju Yun-BAE' are input as recipient information.

The NLI engine detects phone numbers mapped to the input names 'Hwa Kyong-KIM' and 'Ju Yun-BAE' in a directory and sends text having the selected note contents as a text body to the phone numbers. If the selected note contents are an image, the user terminal may additionally convert the image to text so that the other party may recognize it.

Upon completion of the text transmission, the NLI engine displays a notification indicating the processed result, for example, a message 'text has been sent'. Therefore, the user can confirm that the process has been appropriately completed as intended.

Figure 12A:
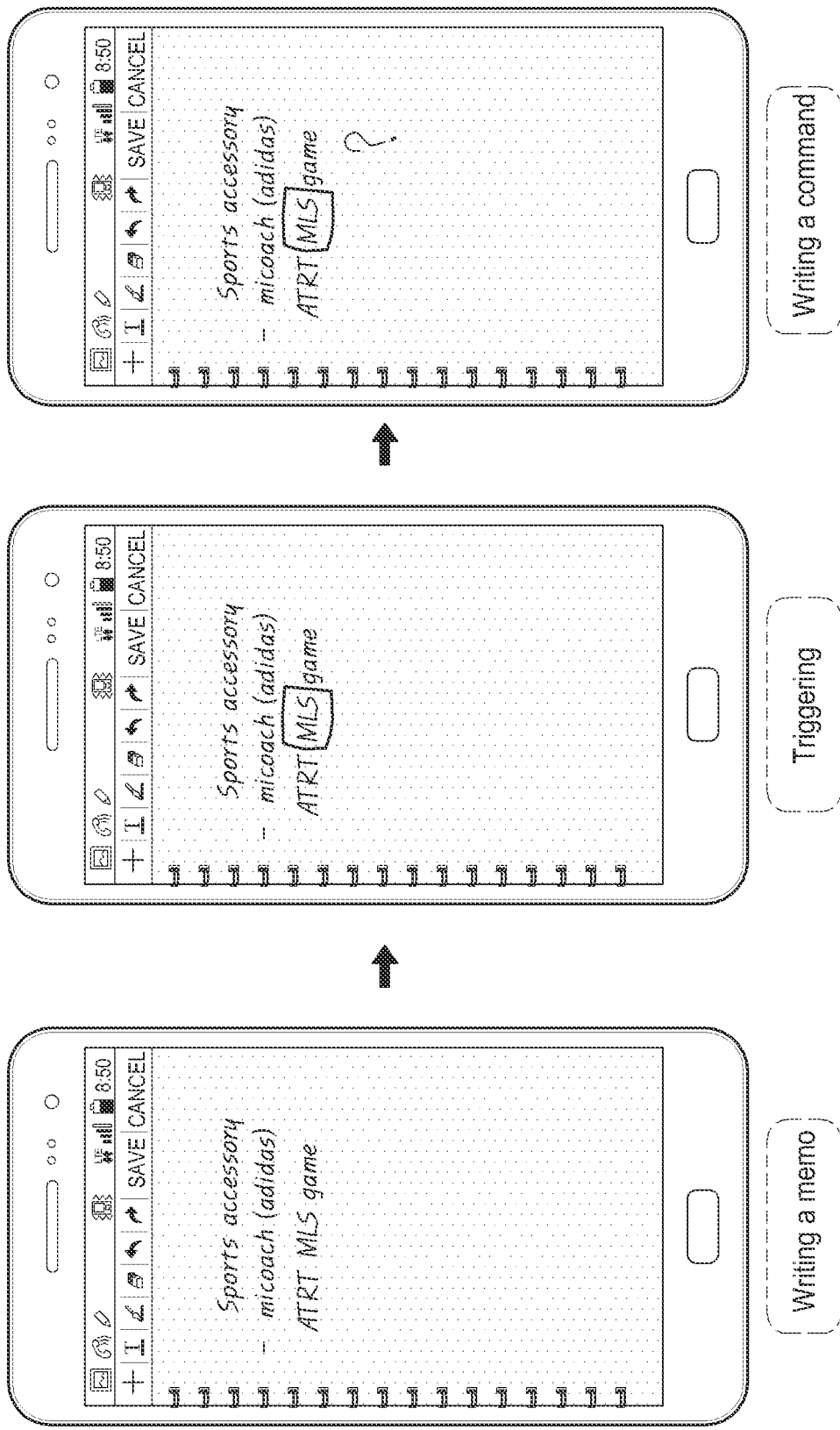
Figure 12B:
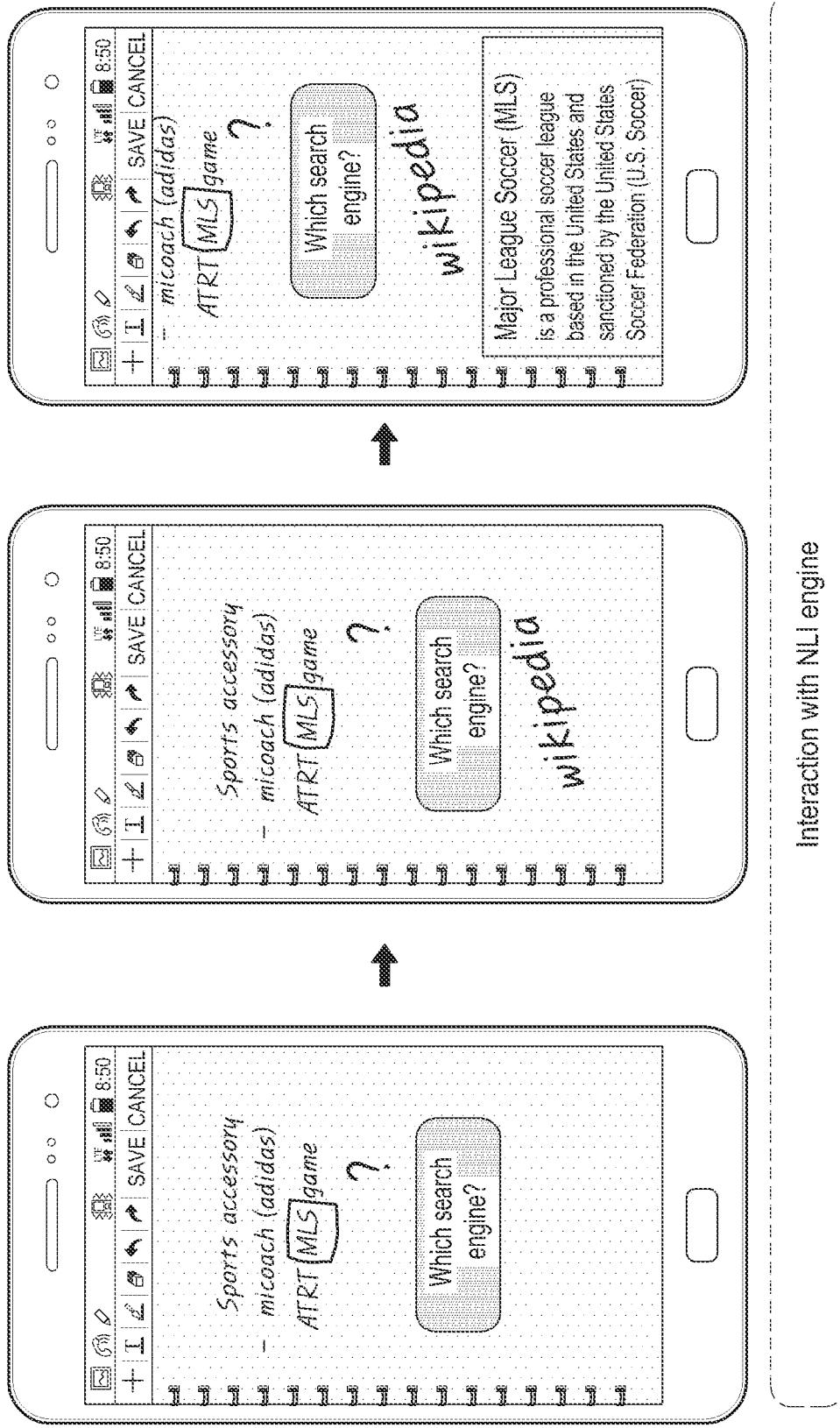

FIGS. 12A and 12B illustrate a scenario of finding the meaning of a part of a note by the memo function in the user terminal.

Referring to FIG. 12A, the user writes a note on a screen by the memo function (i.e., writing a memo). Then the user selects a part of the note using a line, symbol, closed loop, etc. (i.e., triggering). In embodiments, the user may select one word written in a partial area of the note by drawing a closed loop around the word.

The user asks the meaning of the selected word by writing a preset or intuitively recognizable symbol, for example, '?' (i.e., writing a command).

Referring to FIG. 12B, the NLI engine that configures a UI based on user-input information asks the user which engine to use in order to find the meaning of the selected word. For this purpose, the NLI engine uses a question and answer procedure with the user. In embodiments, the NLI engine prompts the user to input information for selecting a search engine by displaying 'Which search engine?' on the screen.

The user inputs 'wikipedia' as an answer by the memo function. Thus, the NLI engine recognizes that the user intends to use 'wikipedia' as a search engine using the user input as a keyword. The NLI engine finds the meaning of the selected word 'NILS' using 'wikipedia' and displays search results. Therefore, the user is aware of the meaning of the 'NILS' from the information displayed on the screen.

Figure 13A:
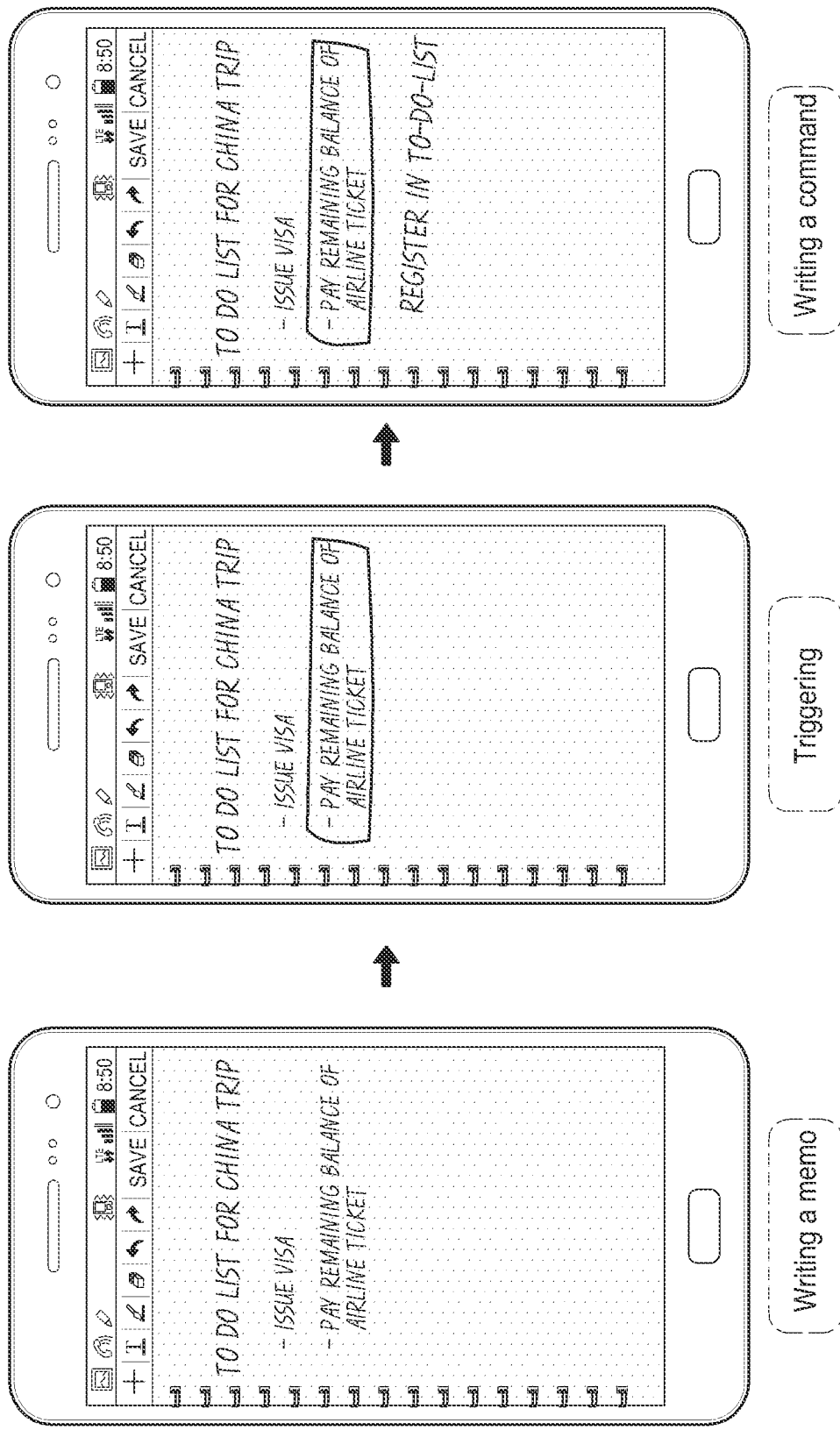
Figure 13B:
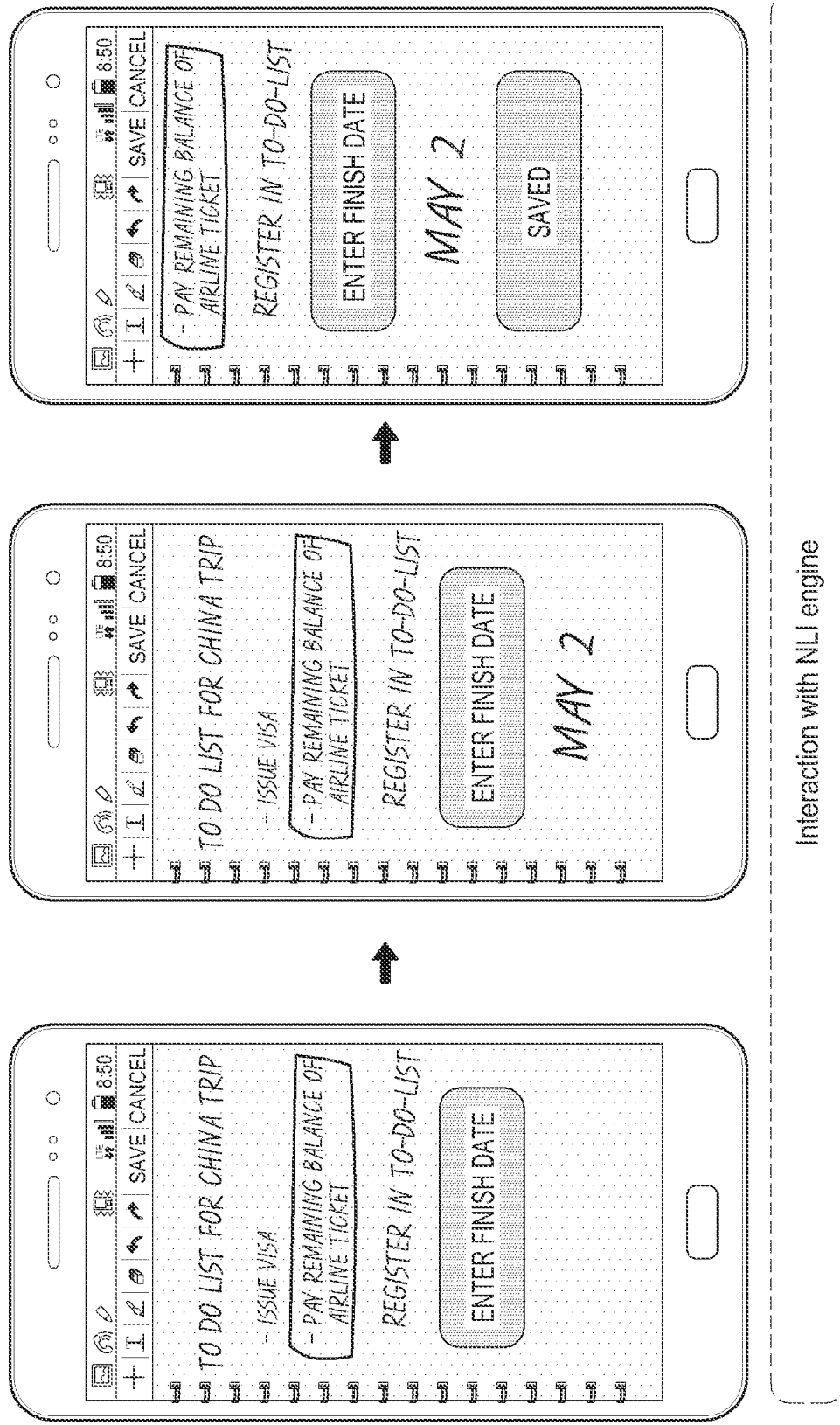

FIGS. 13A and 13B illustrate a scenario of registering a part of a note written by the memo function as information for another application in the user terminal.

Referring to FIG. 13A, the user writes a to-do-list of things to prepare for a China trip on a screen of the user terminal by the memo function (i.e., writing a memo). Then the user selects a part of the note using a line, symbol, closed loop, etc. (i.e., triggering). In embodiments, the user selects 'pay remaining balance of airline ticket' in a part of the note by drawing a closed loop around the text.

The user requests registration of the selected note contents in a to-do-list by writing preset or intuitively recognizable text, for example, 'register in to-do-list' (i.e., writing a command).

Referring to FIG. 13B, the NLI engine that configures a UI based on user-input information recognizes that the user intends to request scheduling of a task corresponding to the selected contents of the note. Then the NLI engine further acquires necessary information by a question and answer procedure with the user, determining that information is insufficient for scheduling. In embodiments, the NLI engine prompts the user to input information by asking a schedule, for example, 'Enter finish date'.

The user inputs 'May 2' as a date by which the task should be finished by the memo function as an answer. Thus, the NLI engine stores the selected contents as a thing to do by May 2.

After processing the user's request, the NLI engine displays the processed result, for example, a message 'saved'. Therefore, the user is aware that an appropriate process has been performed as intended.

Figure 14A:
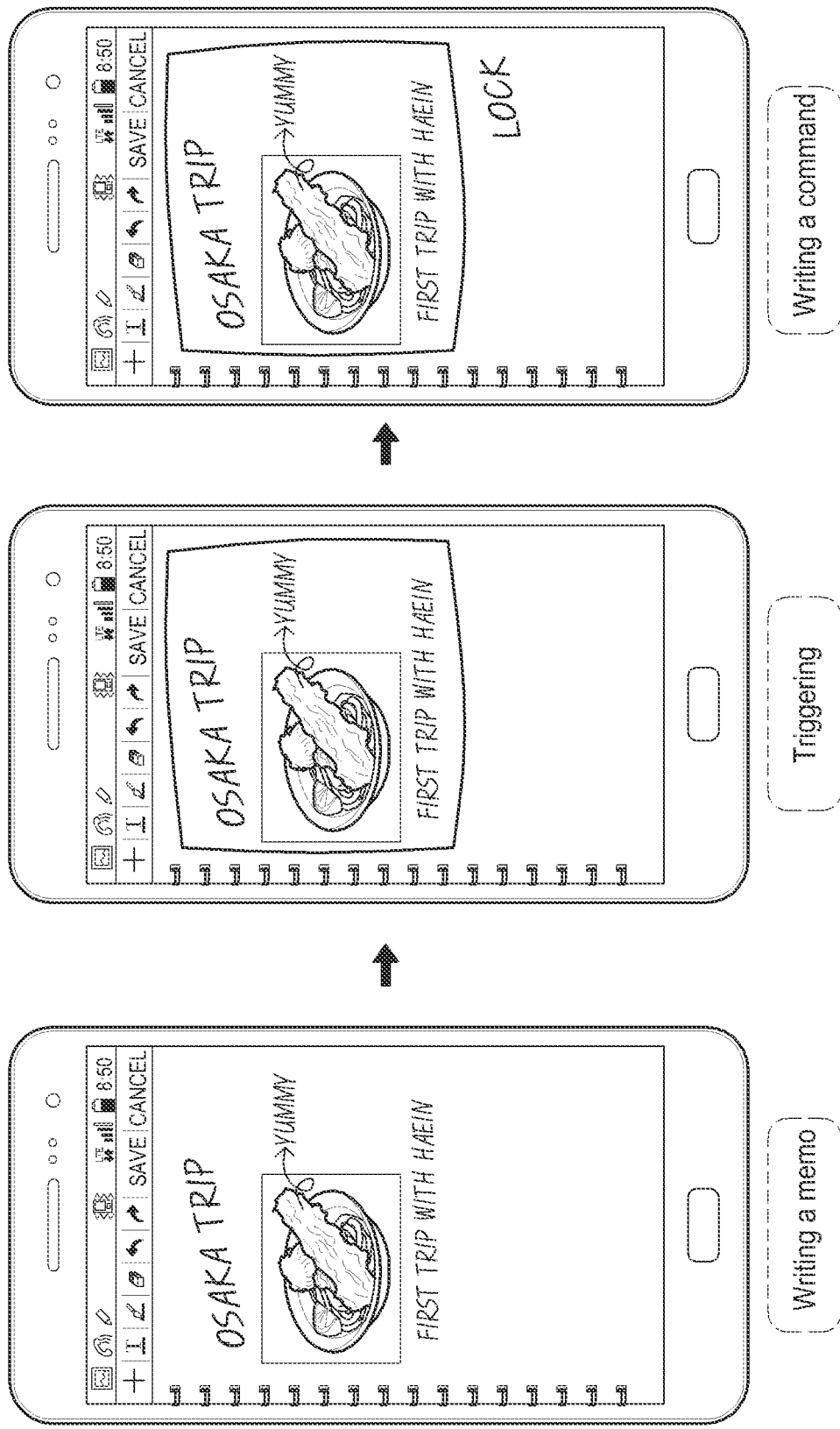
Figure 14B:
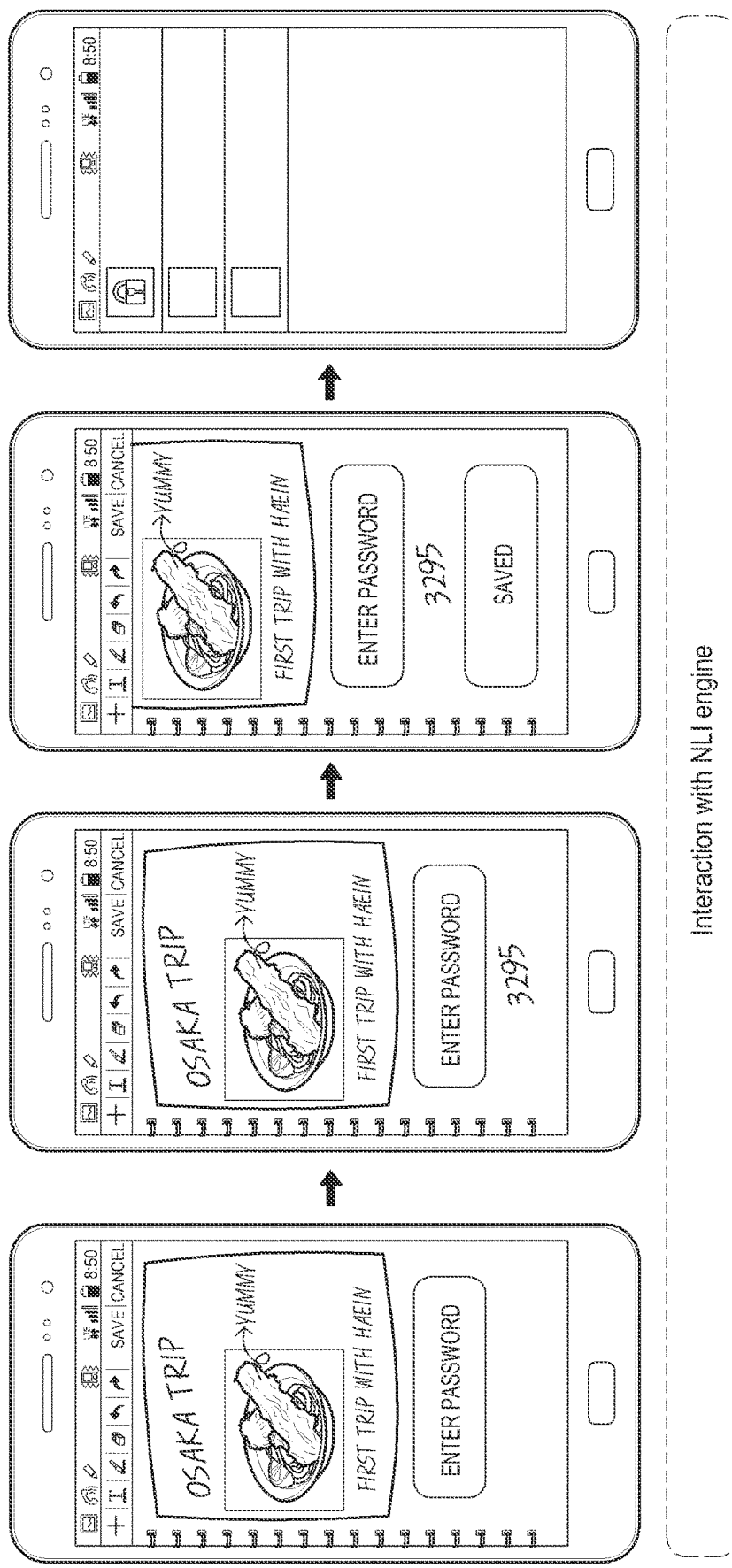
Figure 14C:
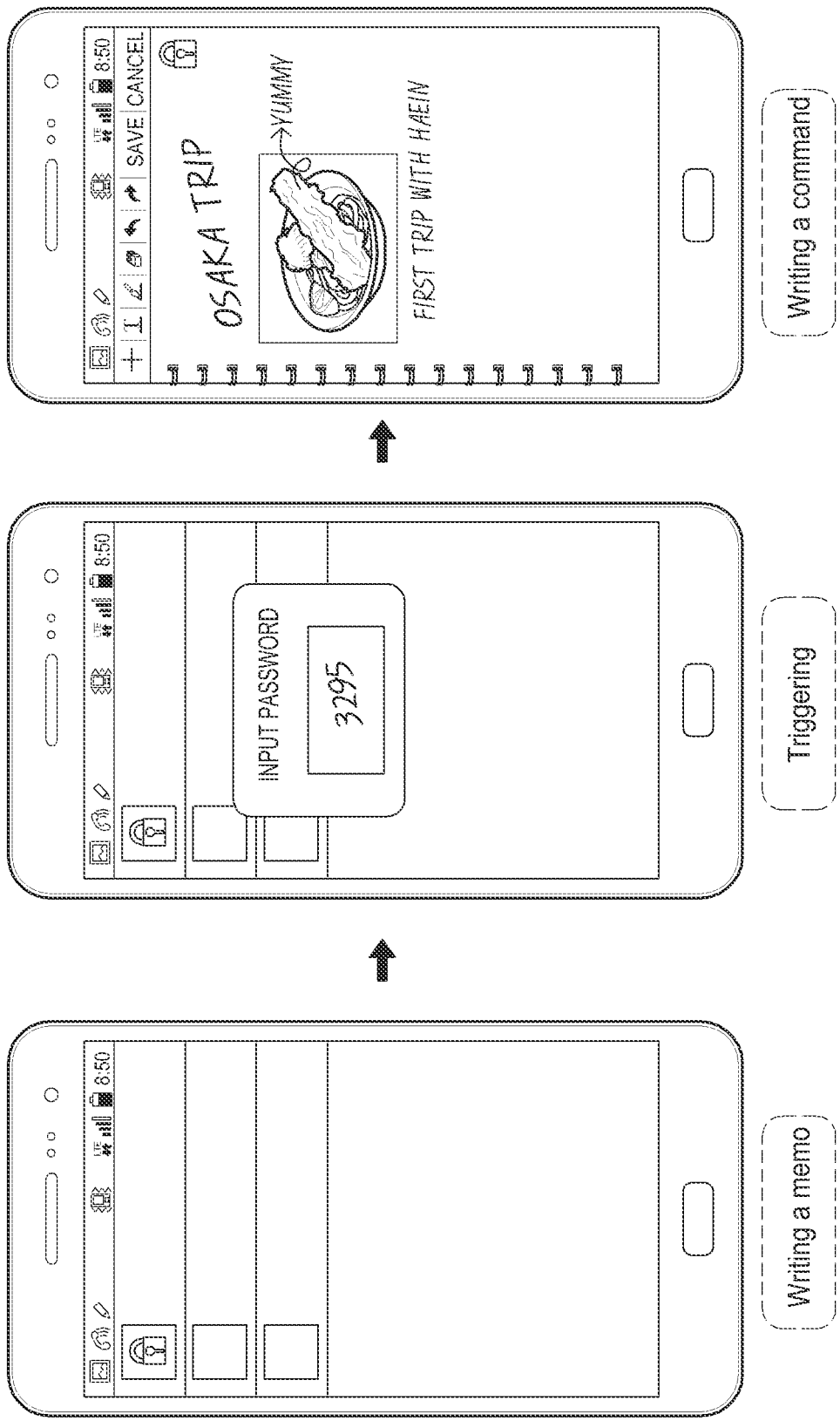

FIG. 14A illustrates a scenario of storing a note written by the memo function using a lock function in the user terminal. FIG. 14B illustrates a scenario of reading the note that has been stored by the lock function. FIG. 14C illustrates a scenario of selecting a note from among notes stored by the lock function.

Referring to FIG. 14A, the user writes the user's experiences during an Osaka trip using a photo and a note on a screen of the user terminal by the memo function (i.e., writing a memo). Then the user selects a whole or part of the note using a line, symbol, closed loop, etc. (i.e., triggering). In embodiments, the user selects the whole note by drawing a closed loop around the note.

The user requests registration of the selected note contents by the lock function by writing preset or intuitively recognizable text, for example, 'lock' (writing command).

Referring to FIG. 14B, the NLI engine that configures a UI based on user-input information recognizes that the user intends to store the contents of the note by the lock function. Then the NLI engine further acquires necessary information by a question and answer procedure with the user, determining that additional information is needed for setting the lock function. In embodiments, the NLI displays a question asking a password, for example, a message 'Enter password' on the screen to set the lock function.

The user writes '3295' as the password by the memo function as an answer in order to set the lock function. Thus, the NLI engine stores the selected note contents using the password '3295'.

After storing the note contents by the lock function, the NLI engine displays a notification indicating the processed result, for example, a message 'saved'. Therefore, the user is aware that an appropriate process has been performed as intended.

Referring to FIG. 14C, the user selects a note from among notes stored by the lock function (i.e., selecting a memo). Upon selection of a specific note by the user, the NLI engine prompts the user to enter the password by a question and answer procedure, determining that the password is needed to provide the selected note (writing password). In embodiments, the NLI engine displays a memo window in which the user may enter the password.

When the user enters the valid password, the NLI engine displays the selected note on a screen.

Figure 15:
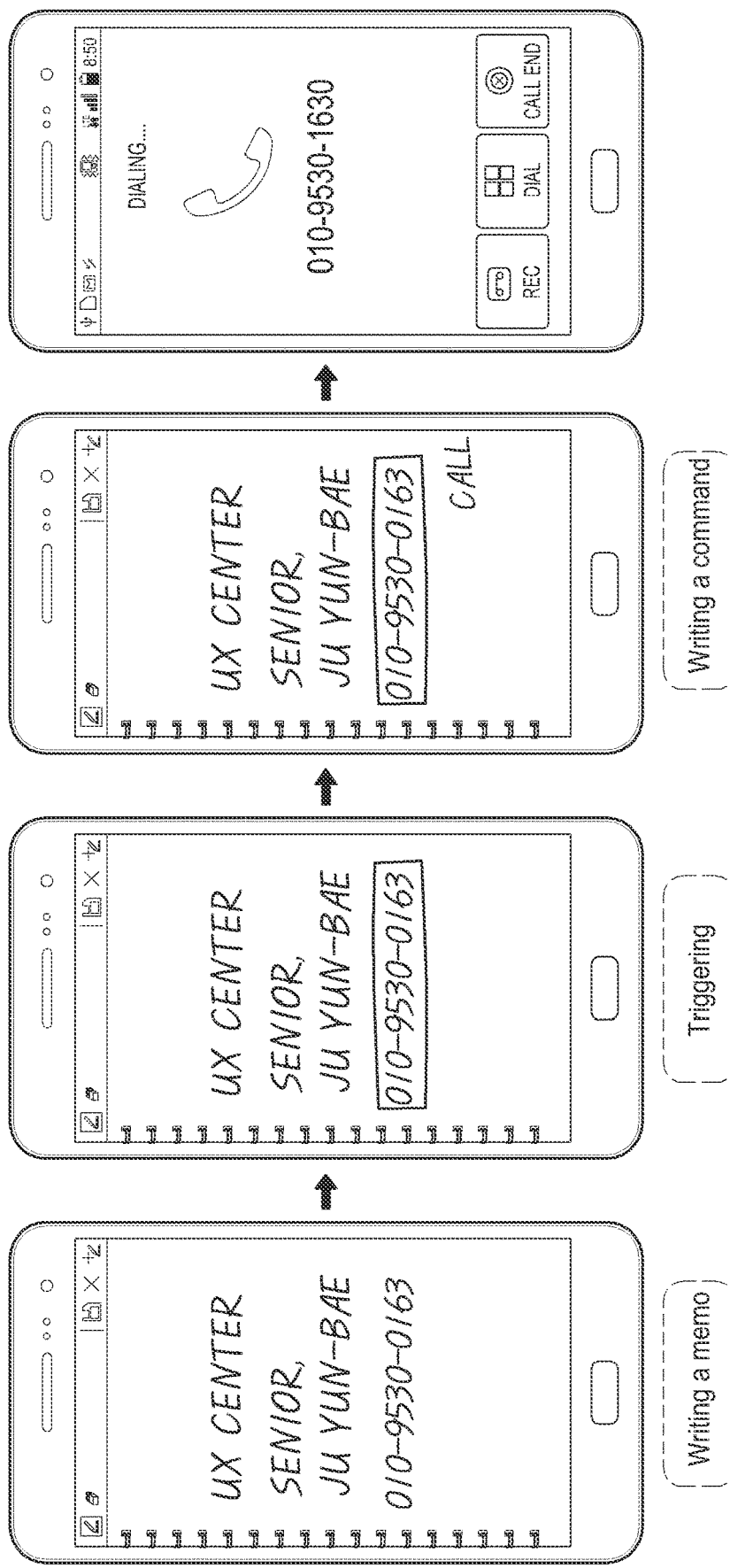

FIG. 15 illustrates a scenario of executing a specific function using a part of a note written by the memo function in the user terminal.

Referring to FIG. 15, the user writes a note on a screen of the user terminal by the memo function (i.e., writing a memo). Then the user selects a part of the note using a line, symbol, closed loop, etc. (i.e., triggering). In embodiments, the user may select a phone number '010-9530-0163' in the full note by drawing a closed loop around the phone number.

The user requests dialing of the phone number by writing preset or intuitively recognizable text, for example, 'call' (i.e., writing a command).

The NLI engine that configures a UI based on user-input information recognizes the selected phone number by translating it into a natural language and attempts to dial the phone number '010-9530-0163'.

Figure 16A:
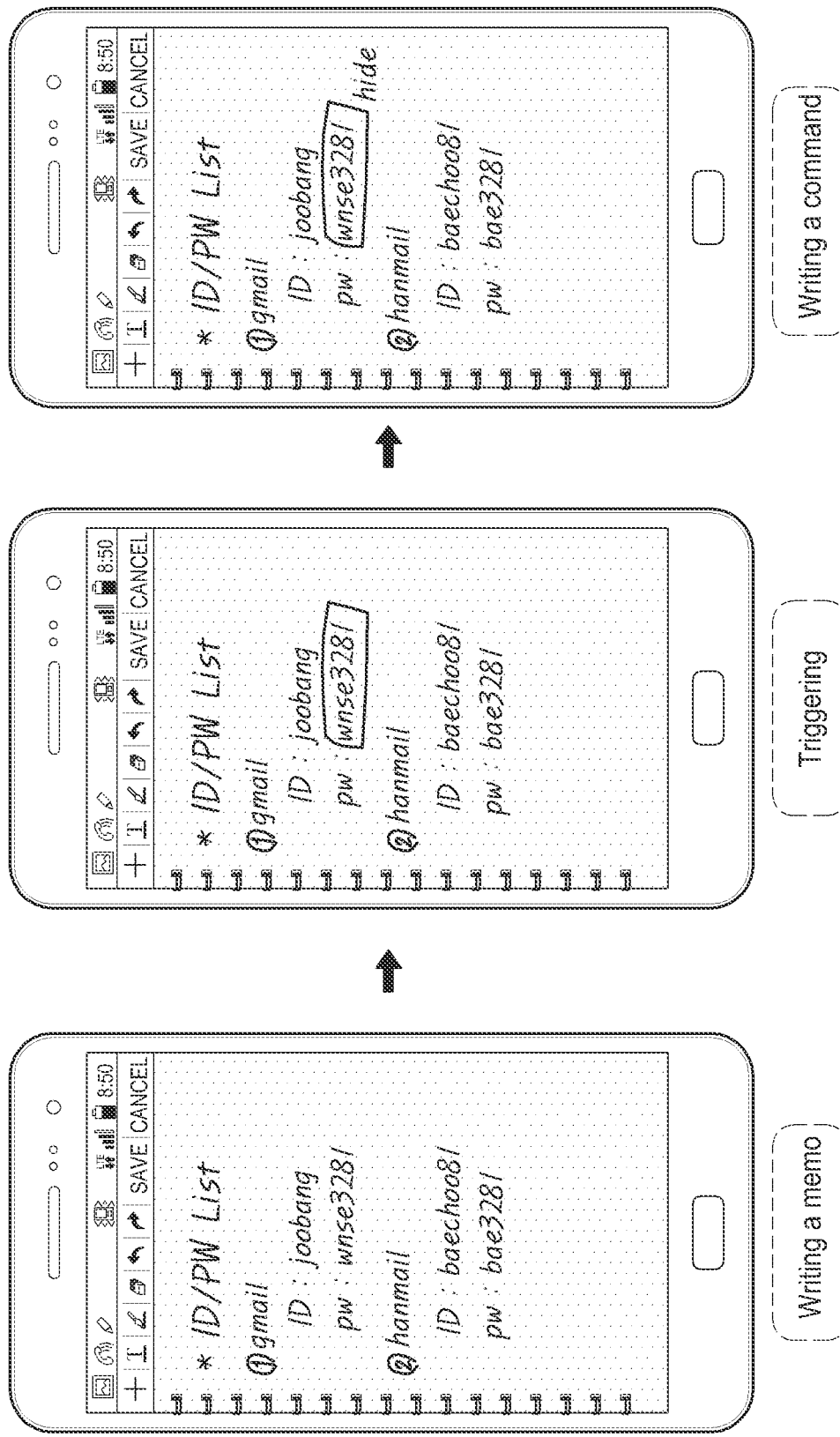
Figure 16B:
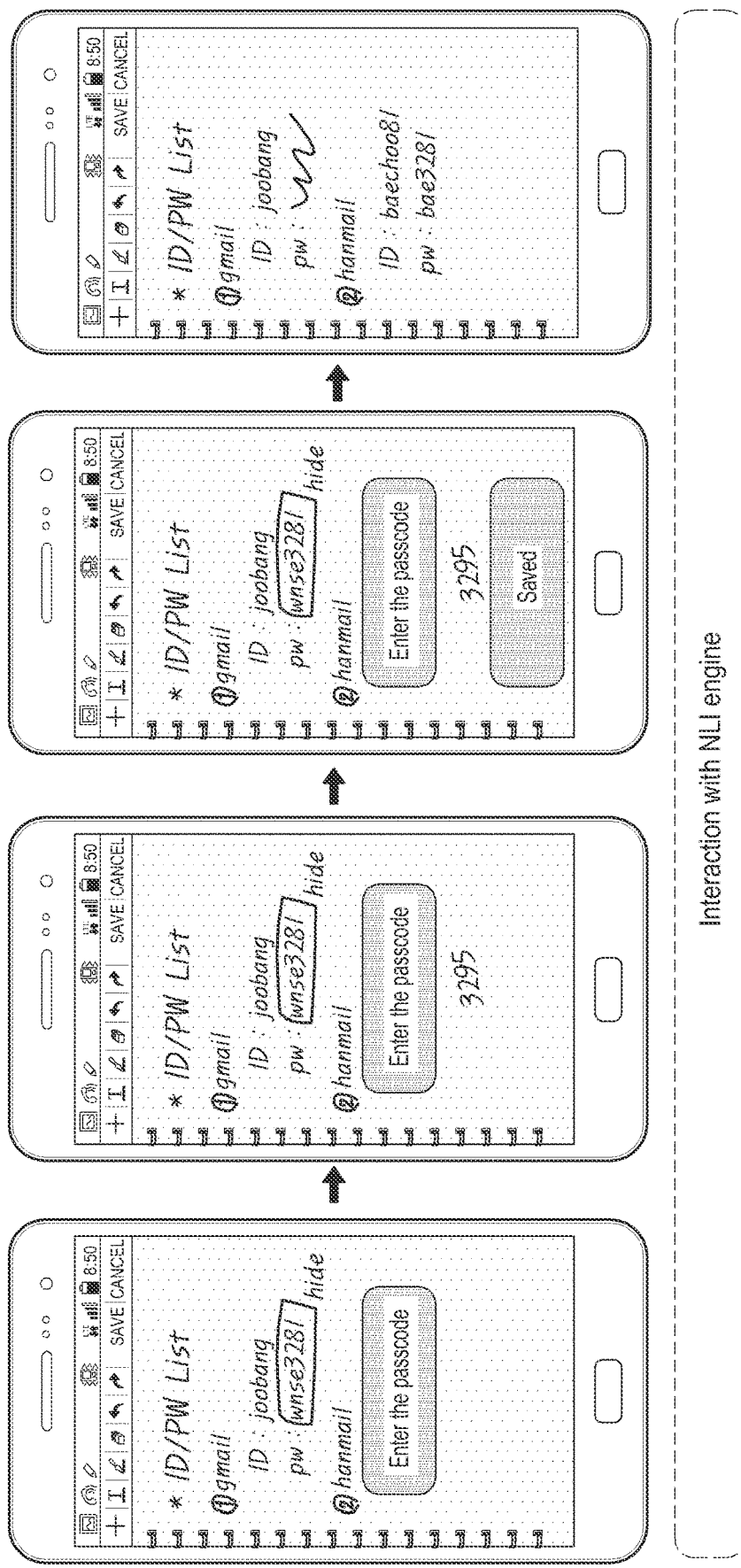

FIGS. 16A and 16B illustrate a scenario of hiding a part of a note written by the memo function in the user terminal.

Referring to FIG. 16A, the user writes an ID and a password for each Web site that the user visits on a screen of the user terminal by the memo function (i.e., writing a memo). Then the user selects a whole or part of the note using a line, symbol, closed loop, etc. (i.e., triggering). In embodiments, the user selects a password 'wnse3281' written in a part of the note by drawing a closed loop around the password.

The user requests hiding of the selected contents by writing preset or intuitively recognizable text, for example, 'hide' (i.e., writing a command).

Referring to FIG. 16B, the NLI engine that configures a UI based on user-input information recognizes that the user intends to hide the selected note contents. To use a hiding function, the NLI engine further acquires necessary information from the user by a question and answer procedure, determining that additional information is needed. The NLI engine outputs a question asking the password, for example, a message 'Enter the passcode' to set the hiding function.

When the user writes '3295' as the password by the memo function as an answer to set the hiding function, the NLI engine recognizes '3295' by translating it into a natural language and stores '3295'. Then the NLI engine hides the selected note contents so that the password does not appear on the screen.

Figure 17:
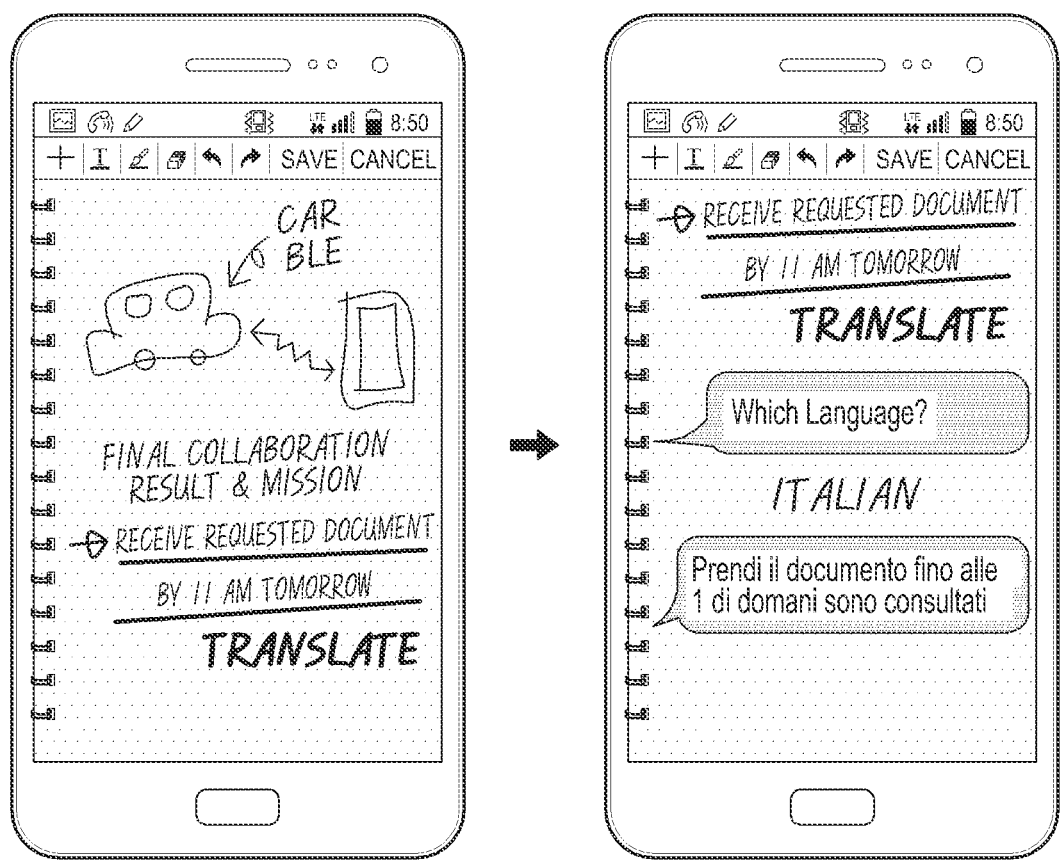

FIG. 17 illustrates a scenario of translating a part of a note written by the memo function in the user terminal.

Referring to FIG. 17, the user writes a note on a screen of the user terminal by the memo function (i.e., writing a memo). Then the user selects a part of the note using a line, symbol, closed loop, etc. (i.e., triggering). In embodiments, the user selects a sentence 'receive requested document by 11 AM tomorrow' written in a part of the note by underlining the sentence.

The user requests translation of the selected contents by writing preset or intuitively recognizable text, for example, 'translate' (i.e., writing a command).

The NLI engine that configures a UI based on user-input information recognizes that the user intends to request translation of the selected note contents. Then the NLI engine displays a question asking a language into which the selected note contents are to be translated by a question and answer procedure. In embodiments, the NLI engine prompts the user to enter an intended language by displaying a message 'Which language?' on the screen.

When the user writes 'Italian' as an answer by the memo function, the NLI engine recognizes that 'Italian' is the user's intended language. Then the NLI engine translates the recognized note contents, that is, the sentence 'receive requested document by 11 AM tomorrow' into Italian and outputs the translation. Therefore, the user reads the Italian translation of the requested sentence on the screen.

While the question and answer procedure is performed based on handwriting between the user and the user terminal in the above operation scenarios, the operation scenarios may use hybrid NLI supporting both voice-based and handwriting-based UIs, not limited to the handwriting-based question and answer procedure.

FIGS. 18, 19, 20, 21, 22, and 23 illustrate scenarios of invoking an application supporting the memo function after a specific application is activated and then executing the activated application using the invoked application according to an embodiment of the present disclosure.

Figure 18:
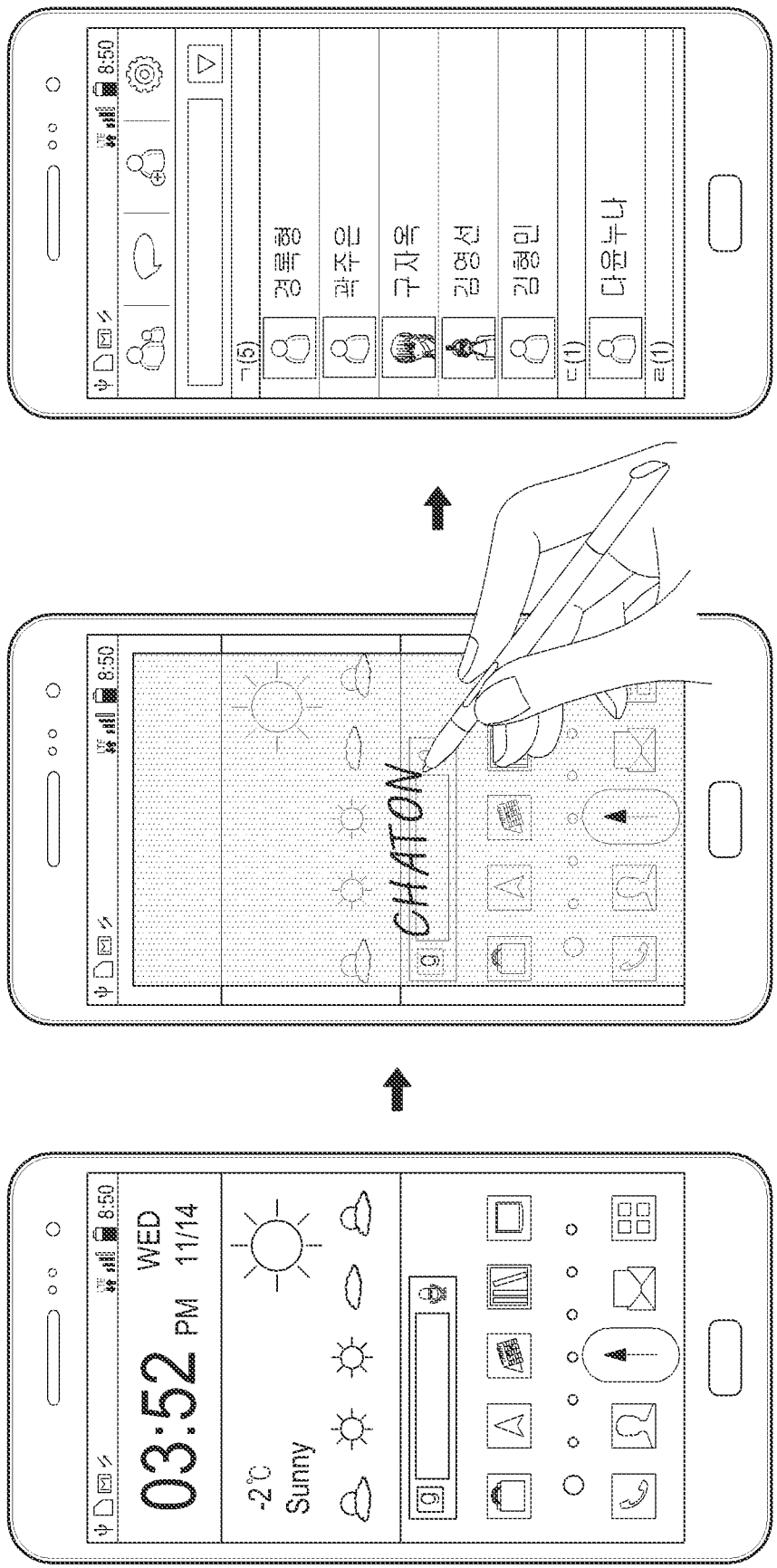
FIGS. 18, 19, 20, 21, 22, and 23 illustrate scenarios of invoking an application supporting the memo function after a specific application is activated and then executing the activated application using the invoked application according to an embodiment of the present disclosure.

Referring to FIG. 18, the figure illustrates a scenario of executing a memo layer on a home screen of the user terminal and executing a specific application on the memo layer. In embodiments, the user terminal launches a memo layer on the home screen by executing a memo application on the home screen and then executes the application upon receipt of written identification information about the application (e.g., the name of the application) 'Chaton'.

Figure 19:
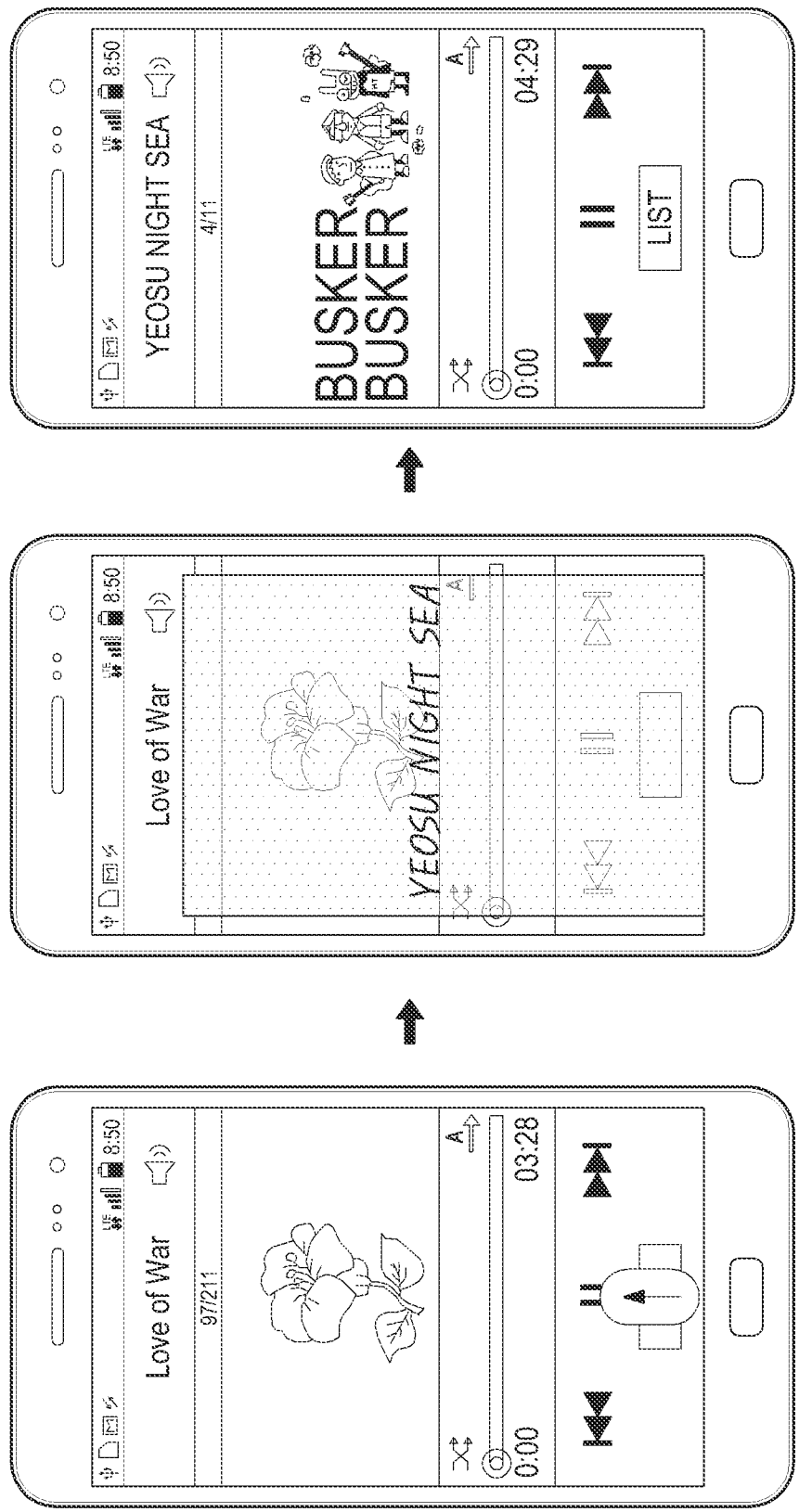

Referring to FIG. 19, the figure illustrates a scenario of controlling a specific operation in a specific active application by the memo function in the user terminal. In embodiments, a memo layer is launched by executing a memo application on a screen on which a music play application has already been executed. Then, when the user writes the title of an intended song, 'Yeosu Night Sea" on the screen, the user terminal plays a sound source corresponding to 'Yeosu Night Sea' in the active application.

Figure 20:
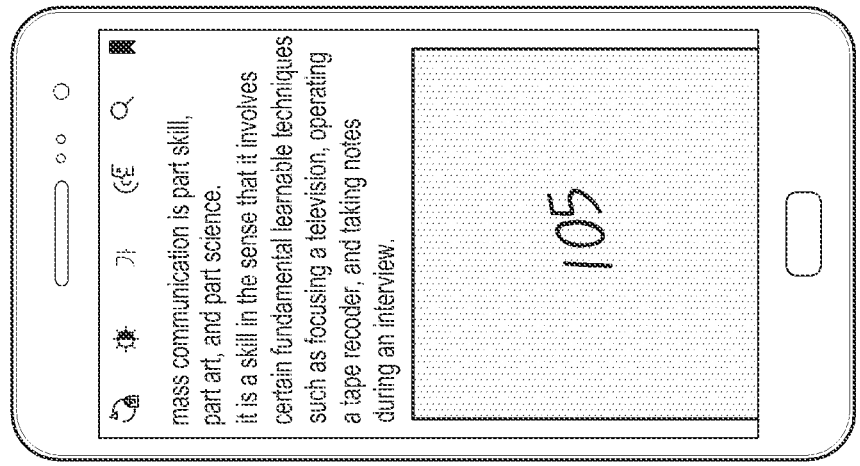
Figure 20:
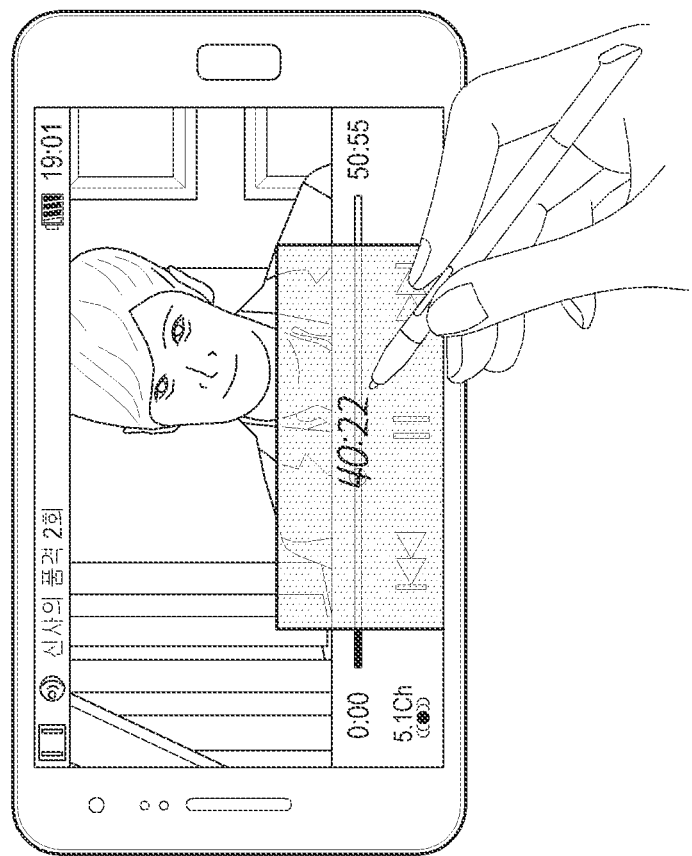

Referring to FIG. 20, the figure illustrates scenarios of controlling a specific active application by the memo function in the user terminal. In embodiments, if the user writes a time to jump to, '40:22' on a memo layer during viewing a video, the user terminal jumps to a time point of 40 minutes 22 seconds to play the on-going video. This function may be performed in the same manner during listening to music as well as during viewing a video.

In addition, while reading a book using an e-book application, the user may write a page to jump to, for example, '105' by invoking a memo layer. Then the user terminal jumps to page 105 of the book.

Figure 21:
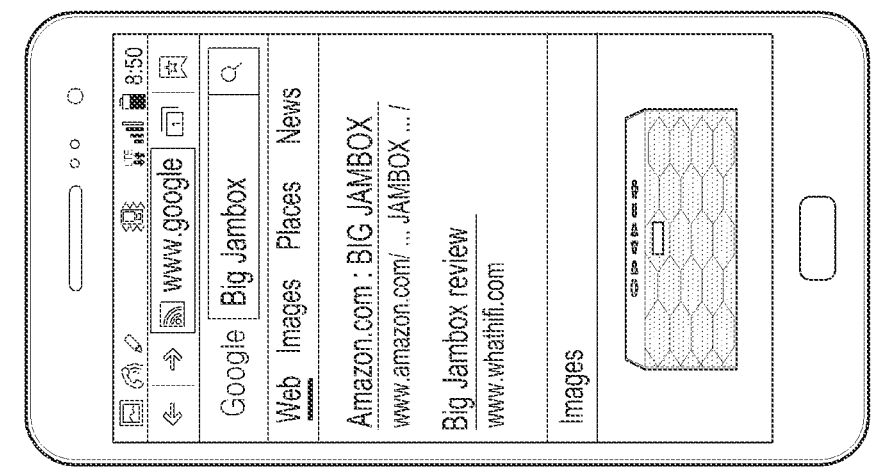
Figure 21:
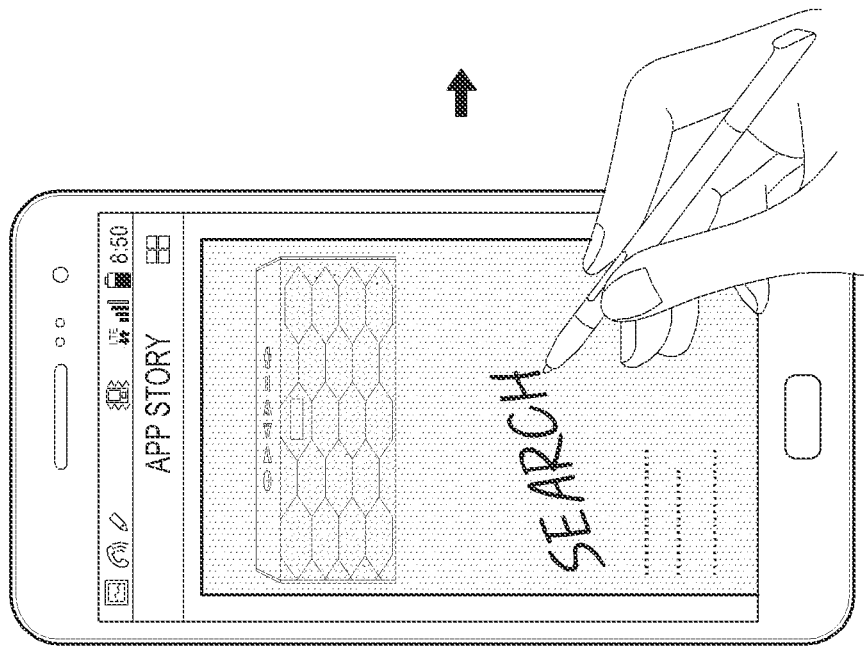
Figure 21:
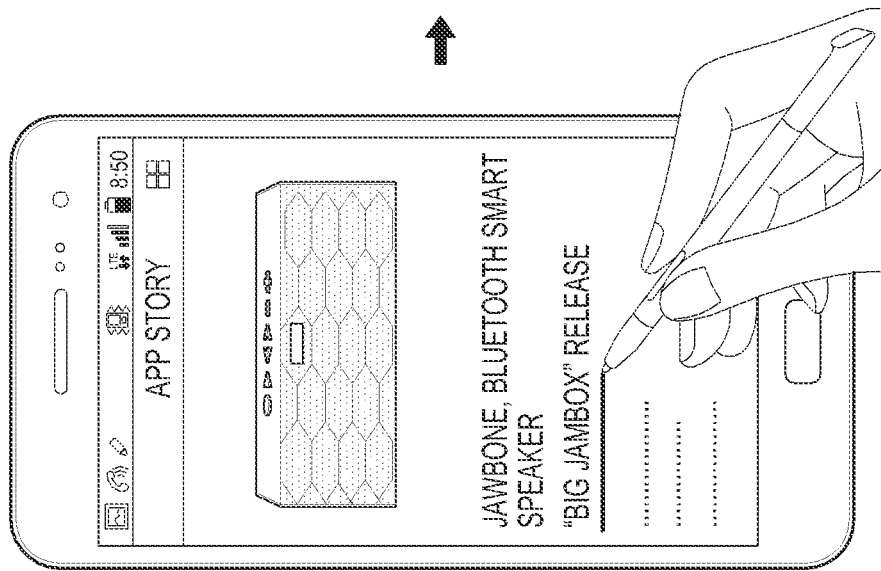

Referring to FIG. 21, the figure illustrates a scenario of attempting a search using the memo function while a Web browser is being executed in the user terminal. In embodiments, while reading a specific Web page using the Web browser, the user selects a part of the contents displayed on a screen (e.g., with a pen), launches a memo layer, and then writes a word 'search' on the memo layer as a writing command, thereby commanding a search using the selected contents as a keyword. The NLI engine recognizes the user's intention and understands the selected contents through a natural language process. Then the NLI engine executed the command and searches using a set search engine using the selected contents and displays search results on the screen.

As described above, the user terminal may operate in a scenario that takes into account both selection and memo function-based information input on a screen that provides a specific application.

Figure 22:
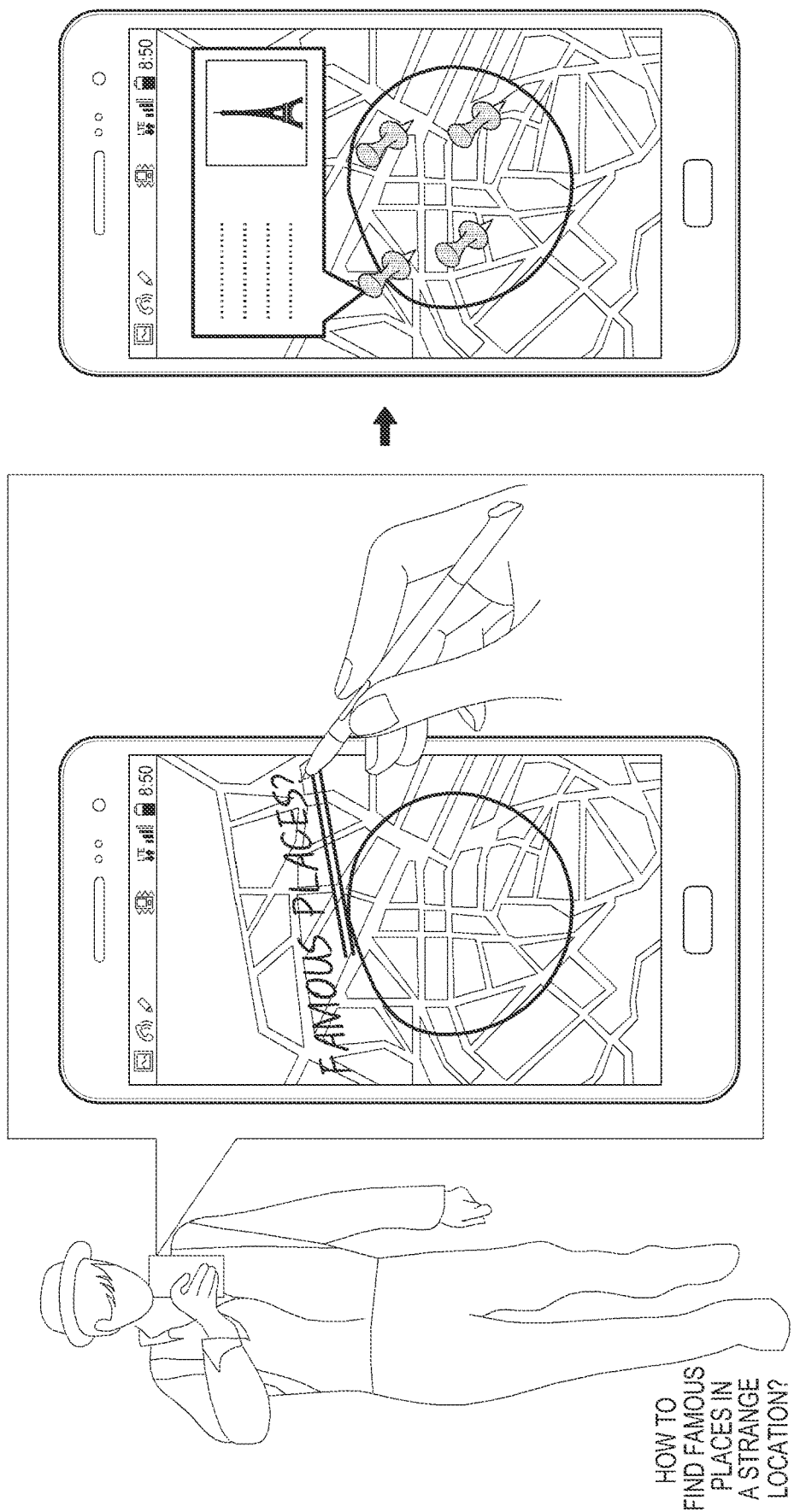

Referring to FIG. 22, the figure illustrates a scenario of acquiring intended information in a map application by the memo function. In embodiments, the user selects a specific area by drawing a closed loop around the area on a screen of a map application using the memo function and writes information to search for, for example, 'famous place?', thereby commanding a search for famous places within the selected area.

When recognizing the user's intention, the NLI engine searches for useful information in its preserved database or a database of a server and additionally displays detected information on the map displayed on the current screen.

Figure 23:
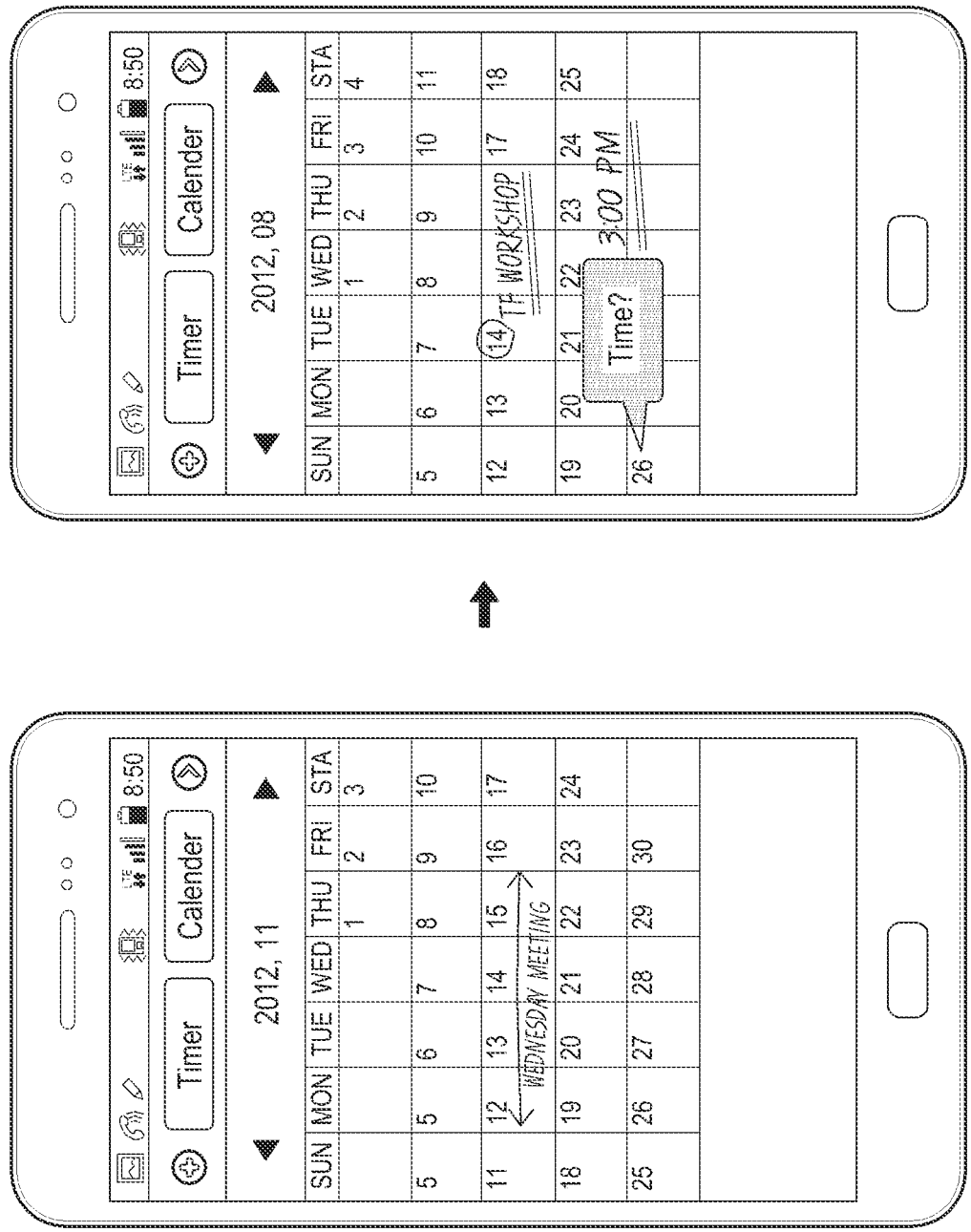

Referring to FIG. 23, the figure illustrates a scenario of inputting intended information by the memo function, while a scheduler application is being activated. In embodiments, while the scheduler application is being activated, the user executes the memo function and writes information on a screen, as is done offline intuitively. For instance, the user selects a specific date by drawing a closed loop on the scheduler screen and writes a plan for the date. That is, the user selects Mar. 13, 2012 and writes 'TF workshop' for the date. Then the NLI engine of the user terminal 100 requests input of time as additional information. In embodiments, the NLI engine displays a question 'Time?' on the screen so as to prompt the user to enter an accurate time such as '3:00 PM' by the memo function.

Figure 24:
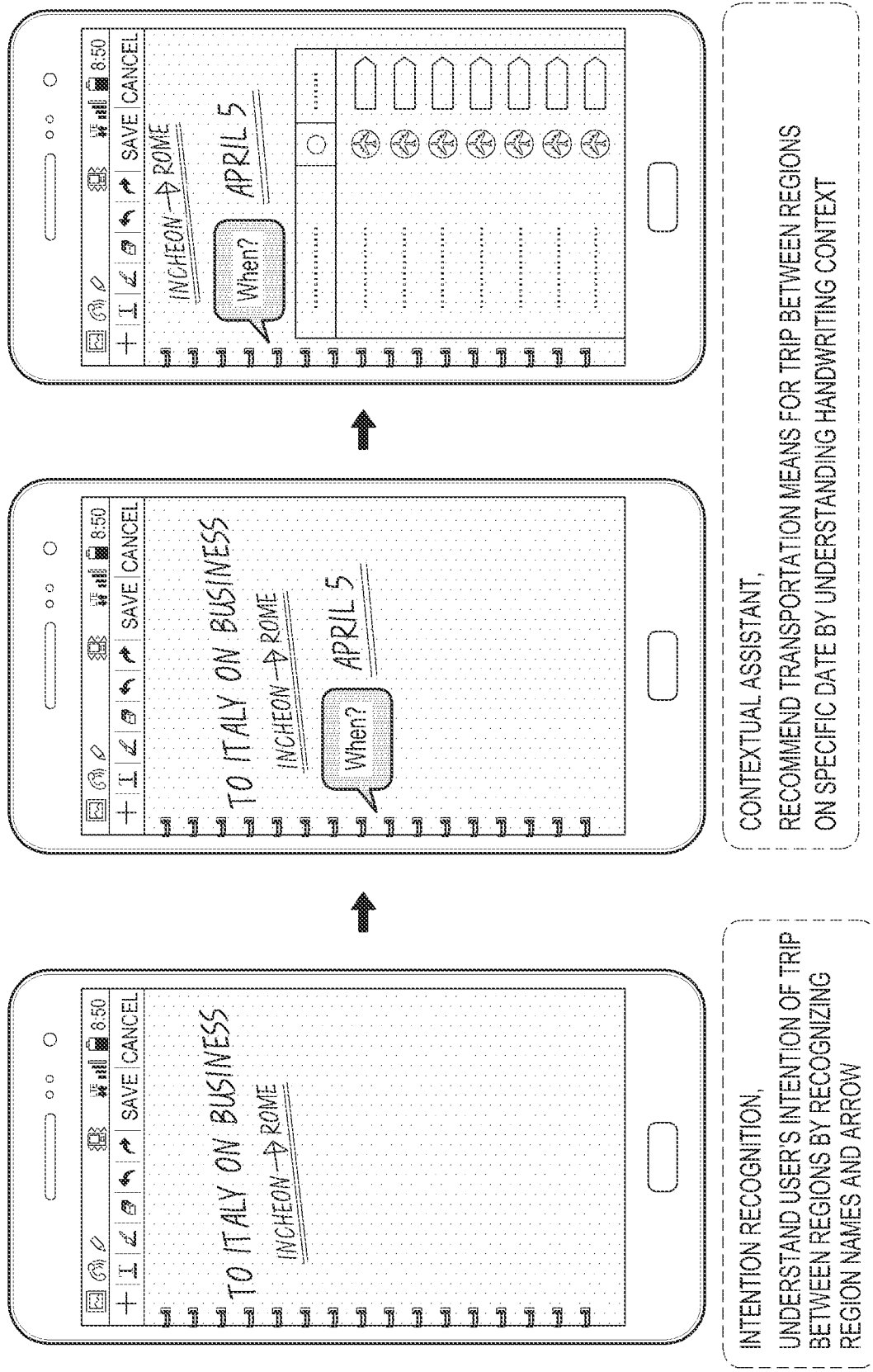
FIGS. 24 and 25 illustrate scenarios related to semiotics according to an embodiment of the present disclosure.
Figure 25:
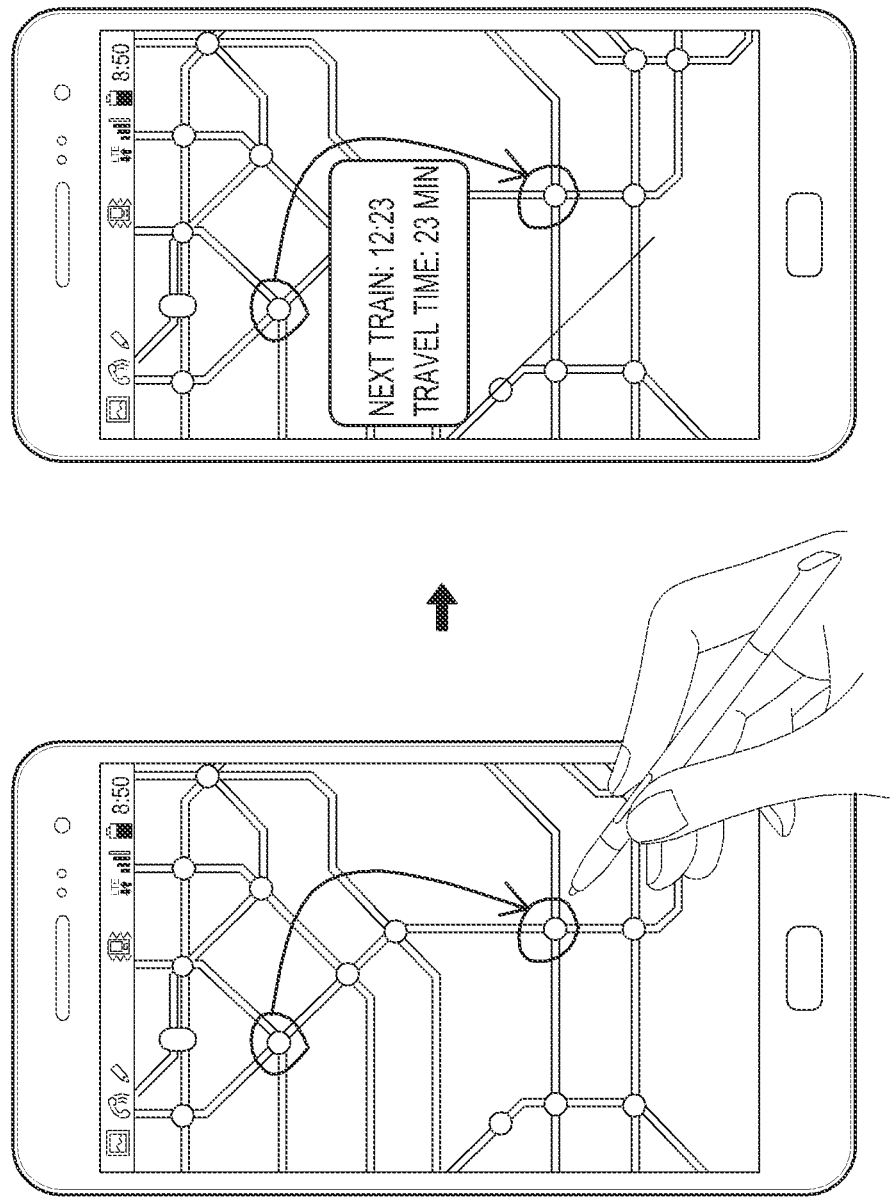

FIGS. 24 and 25 illustrate scenarios related to semiotics according to an embodiment of the present disclosure.

Referring to FIG. 24, the figure illustrates an example of interpreting the meaning of a handwritten symbol in the context of a question and answer flow made by the memo function. In embodiments, it may be assumed that both notes 'to Italy on business' and 'Incheon→Rome' are written. Since the symbol → may be interpreted as a trip from one place to another, the NLI engine of the user terminal 100 outputs a question asking time, for example, 'When?' to the user.

Further, the NLI engine may search for information about flights available for the trip from Incheon to Rome on a user-written date, April 5 and provide search results to the user.

Referring to FIG. 25, the figure illustrates an example of interpreting the meaning of a symbol written by the memo function in conjunction with an activated application. In embodiments, the user selects a departure and a destination using a symbol, that is, an arrow in an intuitive manner on a screen on which a subway application is being activated. Then the user terminal may provide information about the arrival time of a train heading for the destination and a time taken to reach the destination by the currently activated application.

As described above, the present disclosure can increase user convenience by supporting a memo function in various applications and thus controlling the applications in an intuitive manner.

The above-described scenarios are characterized in that when the user launches a memo layer on a screen and writes information on the memo layer, the user terminal recognizes the information and performs an operation corresponding to the information. For this purpose, it may be useful to additionally specify a technique for launching a memo layer on a screen.

In embodiments, the memo layer may be launched on a current screen by pressing a menu button, inputting a specific gesture, keeping a button of a touch pen pressed, or scrolling up or down the screen by a finger. While the memo layer is launched by scrolling up a screen in FIG. 5, by way of example, many other techniques are available.

Figure 26:
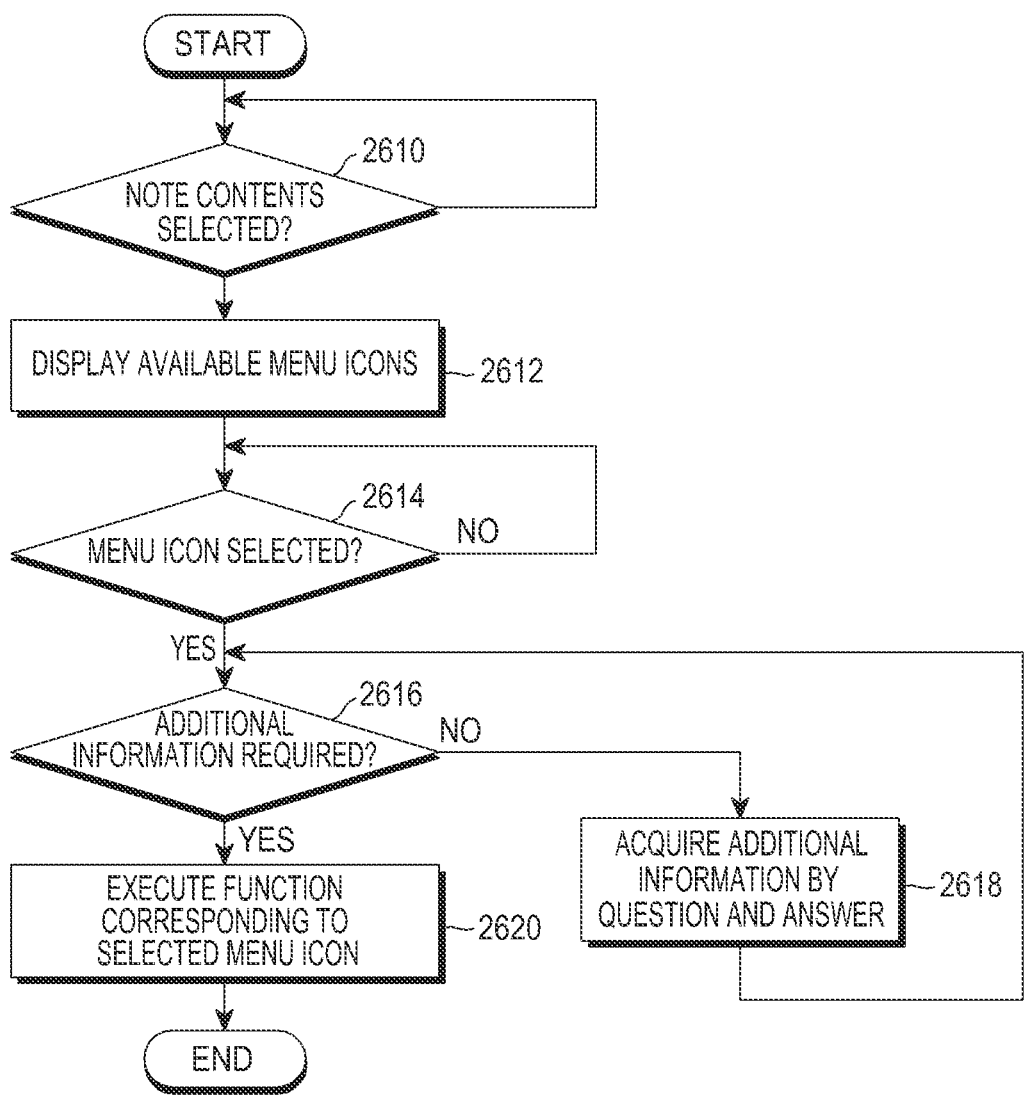
FIG. 26 is a flowchart illustrating a control operation for supporting a UI using a hybrid technology (a hybrid UI) in the user terminal according to an embodiment of the present disclosure.

FIG. 26 is a flowchart illustrating a control operation for supporting a UI using a hybrid technology (referred to as a hybrid UI) in the user terminal according to an embodiment of the present disclosure.

Referring to FIG. 26, the hybrid technology refers to a technology of selectively processing a handwriting command and a voice command. The handwriting command is a command that the user writes by the memo function in the user terminal, and the voice command is a command that the user inputs by voice.

The user terminal having the configuration illustrated in FIG. 1 may perform the control operation illustrated in FIG. 26. In embodiments, the command processor 120 of the user terminal includes a component for processing a handwriting command and a component for processing a voice command.

Referring to FIG. 26, the user terminal monitors selection of a whole or of part of a user-written note displayed on a screen at operation 2610. The note displayed on the screen may be received from the user in real time or retrieved from among pre-stored notes by the user. When the user selects a whole or part of the user-written note displayed on the screen, the user terminal displays menu icons for processing the selected contents of the note at operation 2612. Upon user selection of a specific menu icon, the user terminal determines whether additional information is required to process a command corresponding to the selected menu icon at operation 2616. If determining that additional information is required, the user terminal performs a question and answer procedure to acquire the additional information from the user at operation 2618. On the other hand, if no further information is needed, the user terminal processes the recognized note contents by the function corresponding to the selected menu icon at operation 2620.

Figure 27A:
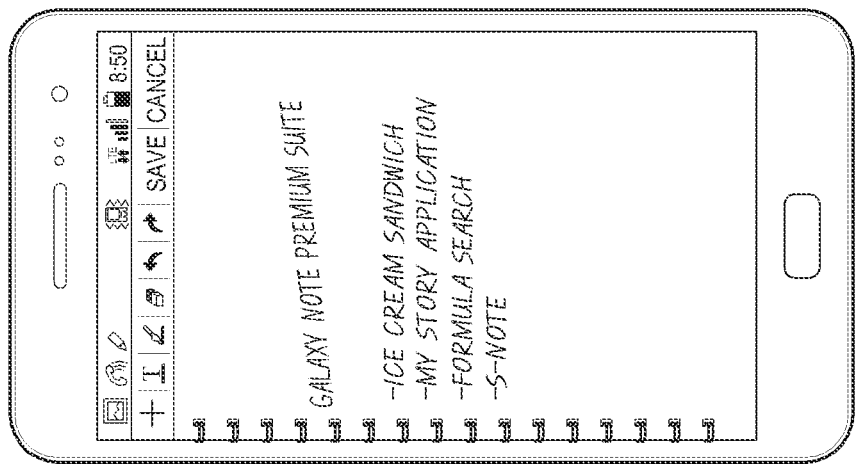
FIGS. 27A, 27B and 27C illustrate an example of processing a hybrid UI in the user terminal according to an embodiment of the present disclosure.
Figure 27B:
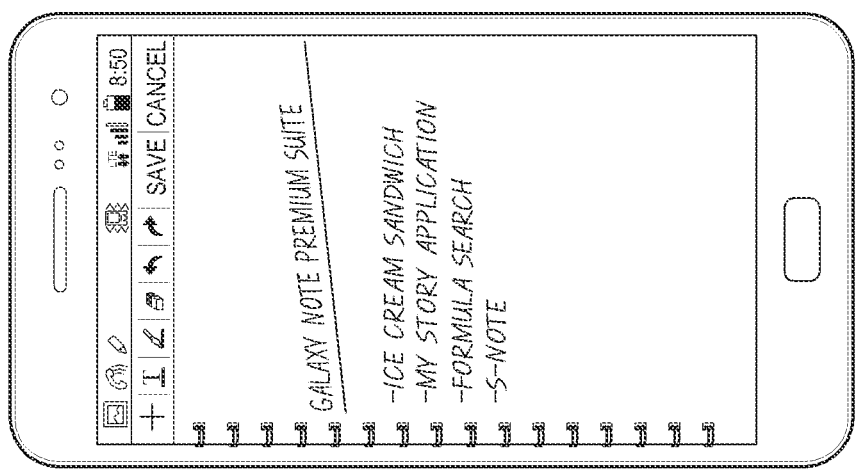
Figure 27C:
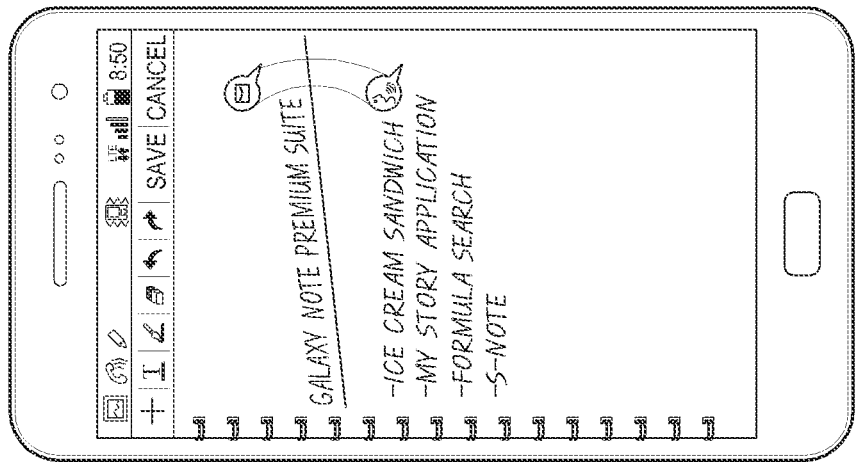
Figure 28C:
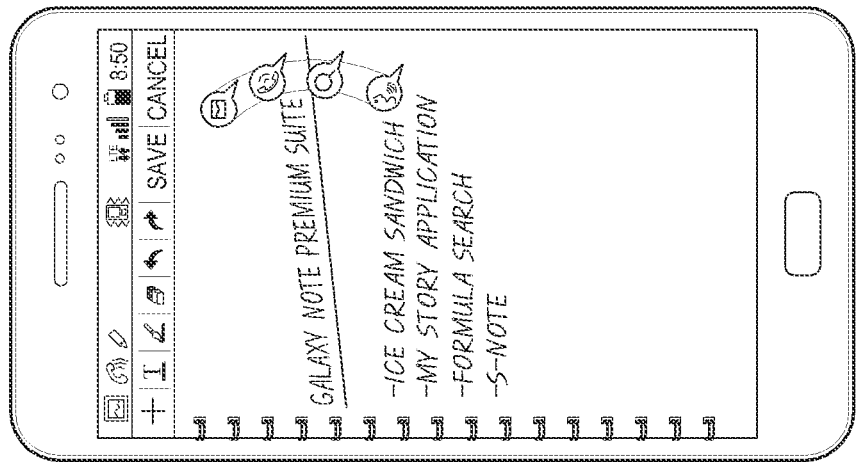
FIGS. 28A, 28B, and 28C illustrate another example of processing a hybrid UI in the user terminal according to an embodiment of the present disclosure.
Figure 28B:
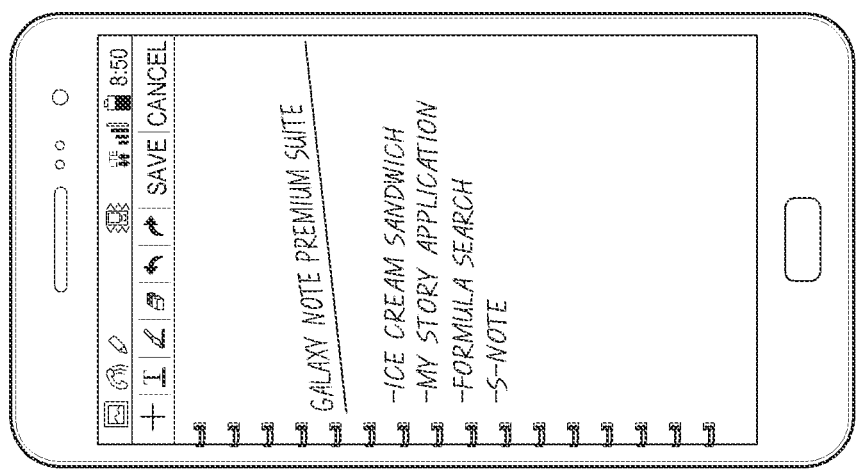
Figure 28A:
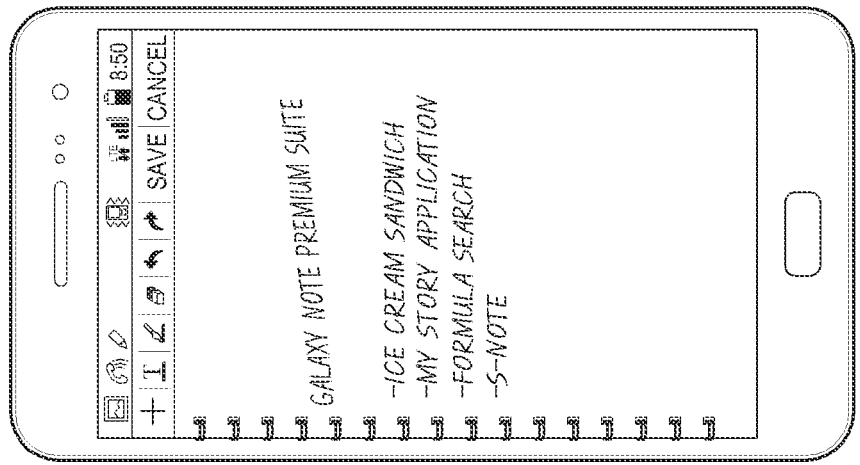

FIGS. 27A, 27B and 27C illustrate an example of processing a hybrid UI in the user terminal according to an embodiment of the present disclosure. FIGS. 28A, 28B, and 28C illustrate another example of processing a hybrid UI in the user terminal according to an embodiment of the present disclosure.

Referring to FIGS. 27A and 28A, a note is displayed on a screen in the user terminal in FIG. 27A and FIG. 28A.

In embodiments, the user selects an intended whole or part of the note displayed on the screen by underlining the whole or partial contents of the note. The user terminal translates the underlined note contents into a natural language and recognizes the user-selected whole or partial contents of the note by the translated natural language.

Referring to FIGS. 27B and 28B, the user selects a part of the note displayed on the screen of the user terminal, i.e., 'galaxy note premium suite,' by underlining 'galaxy note premium suite' in FIG. 27B and FIG. 28B.

When the user selects a whole or part of the user-written note displayed on the screen, the user terminal displays menu icons for processing the selected contents of the note at operation 2612. The user terminal may display only menu icons corresponding to functions available to process the selected contents of the note on the screen, to thereby help the user to select a specific menu icon. To facilitate the user to select a menu icon, the menu icons may be displayed in the vicinity of the selected contents of the note. Since the user typically underlines from left to right, the menu icons are displayed, for example, near to the ending point of the underline.

Referring to FIG. 27C, a menu icon for executing a specific function based on a note (e.g., the upper menu icon) and a menu icon for executing a specific function based on a voice command (e.g., the lower menu icon) are displayed, by way of example.

Referring to FIG. 28C, menu icons for executing functions corresponding to a mail transmission, a call, and a search (i.e., the three upper menu icons) and a menu icon for executing a specific function by an input voice command (i.e., the lowest menu icon) are displayed. While not shown in FIG. 28C, it is obvious that the menu icons for executing specific functions can be extended to further include a menu icon for executing a function corresponding to message transmission.

The user terminal continuously monitors user selection of a menu icon from among the menu icons displayed on the screen at operation 2614. In embodiments, the user may select an intended menu icon by touching the menu icon on the screen.

Upon user selection of a specific menu icon, the user terminal determines whether additional information is required to process a command corresponding to the selected menu icon at operation 2616. That is, the user terminal determines whether there is information sufficient to execute the command corresponding to the selected menu icon.

If determining that additional information is required, the user terminal performs a question and answer procedure to acquire the additional information from the user at operation 2618. That is, the user terminal displays a message prompting the user to input the additional information on the screen and thus acquires the additional information from the user in response to the message.

FIGS. 29A and 29B illustrate an example of processing a selected menu icon corresponding to memo-based command execution in the user terminal according to an embodiment of the present disclosure. FIGS. 30A and 30B illustrate an example of processing a selected menu icon corresponding to voice command execution in the user terminal according to an embodiment of the present disclosure.

Referring to FIGS. 29A and 29B, for example, the user terminal determines from the recognized result of the command corresponding to the user-selected menu icon that the user intends to send the note contents 'galaxy note premium suite' in 'text'. However, the user terminal determines that the user-intended function menu is not available due to the absence of information about a recipient.

Determining that additional information about the recipient is needed, the user terminal displays a message 'To whom will you send the message?' on the screen. When the user writes information about the text recipient, that is, the name (e.g., Ju Yun-BAE) or phone number of the recipient by the menu function, the user terminal recognizes the written information as the additional information.

Upon receipt of the additional information from the user, the user terminal determines whether more additional information is needed. If more additional information is needed, the user terminal repeats the above operation to acquire the additional information.

On the other hand, if no further information is needed, the user terminal processes the recognized note contents by the function corresponding to the selected menu icon at operation 2620. To execute the function corresponding to the selected menu icon, the user terminal may execute an application matching the menu icon. In embodiments, when the user selects the menu icon corresponding to mail transmission, the user terminal may display a mail writing screen including the selected note contents inserted in a mail body based on a pre-set mail account by activating a mail application.

Referring to FIGS. 29A and 29B, if the user has selected a menu icon corresponding to a message transmission function, the user terminal displays a message asking the user who is a recipient to receive a message (refer to FIG. 29A). After reading the message, the user writes information that identifies the message recipient (e.g., the name of the recipient) on the screen (refer to FIG. 29B).

Referring to FIGS. 30A and 30B, if the user has selected the menu icon for executing a voice command, the user terminal displays a message prompting the user to enter a command to process the selected contents on the screen (refer to FIG. 30A) or outputs the message by voice. After reading or hearing the message, the user inputs a command for processing the selected contents (e.g., 'Google search') by voice (refer to FIG. 30B). In this case, the user terminal may perform a search operation regarding 'galaxy note premium suite' using the search engine, Google and may output search results on the screen.

That is, the user terminal determines the user's intention from a written note or a voice input and processes selected contents according to the user's intention.

Figure 31A:
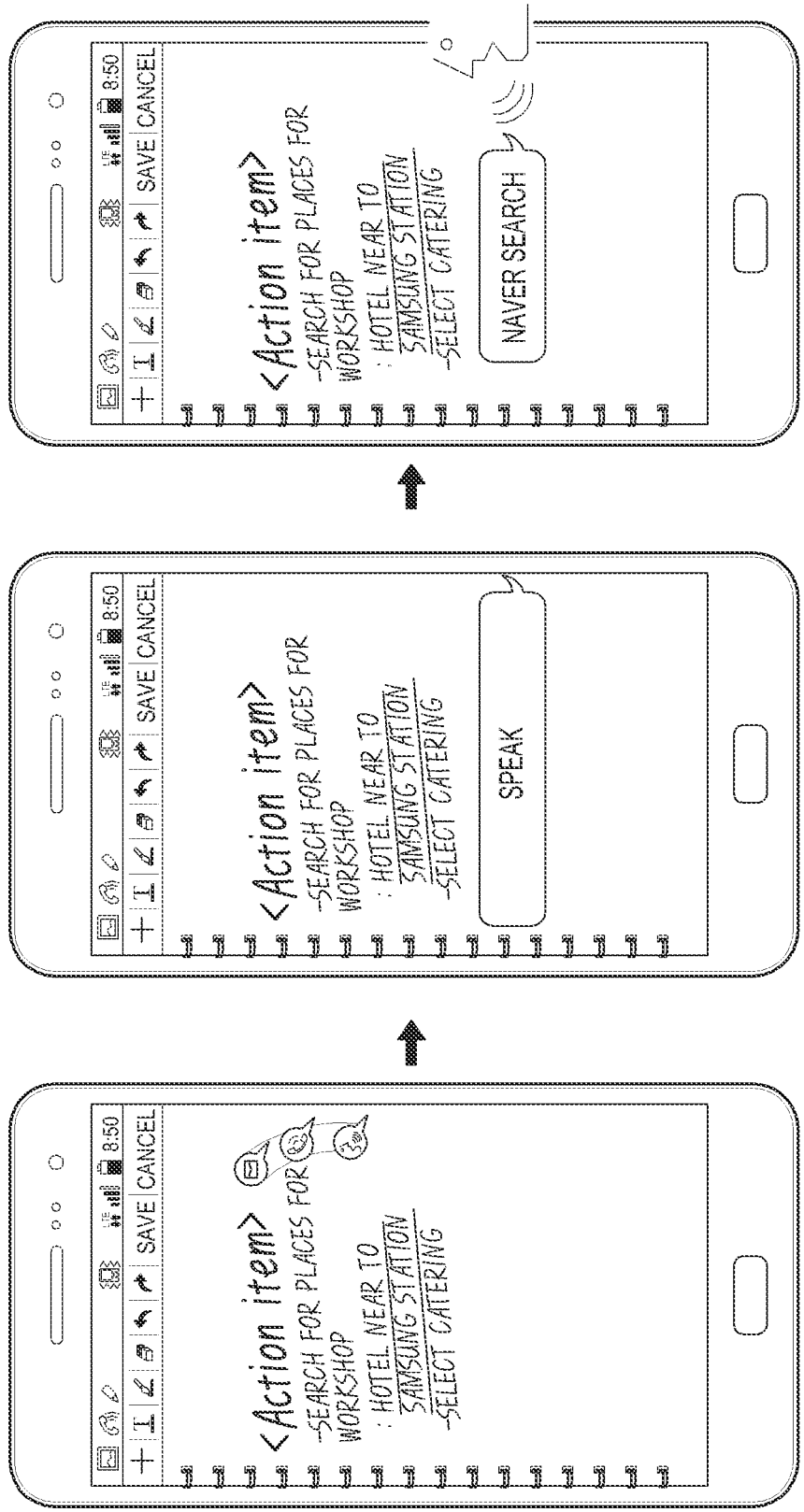
FIGS. 31A and 31B illustrate a scenario of supporting a hybrid UI in the user terminal according to an embodiment of the present disclosure.
Figure 31B:
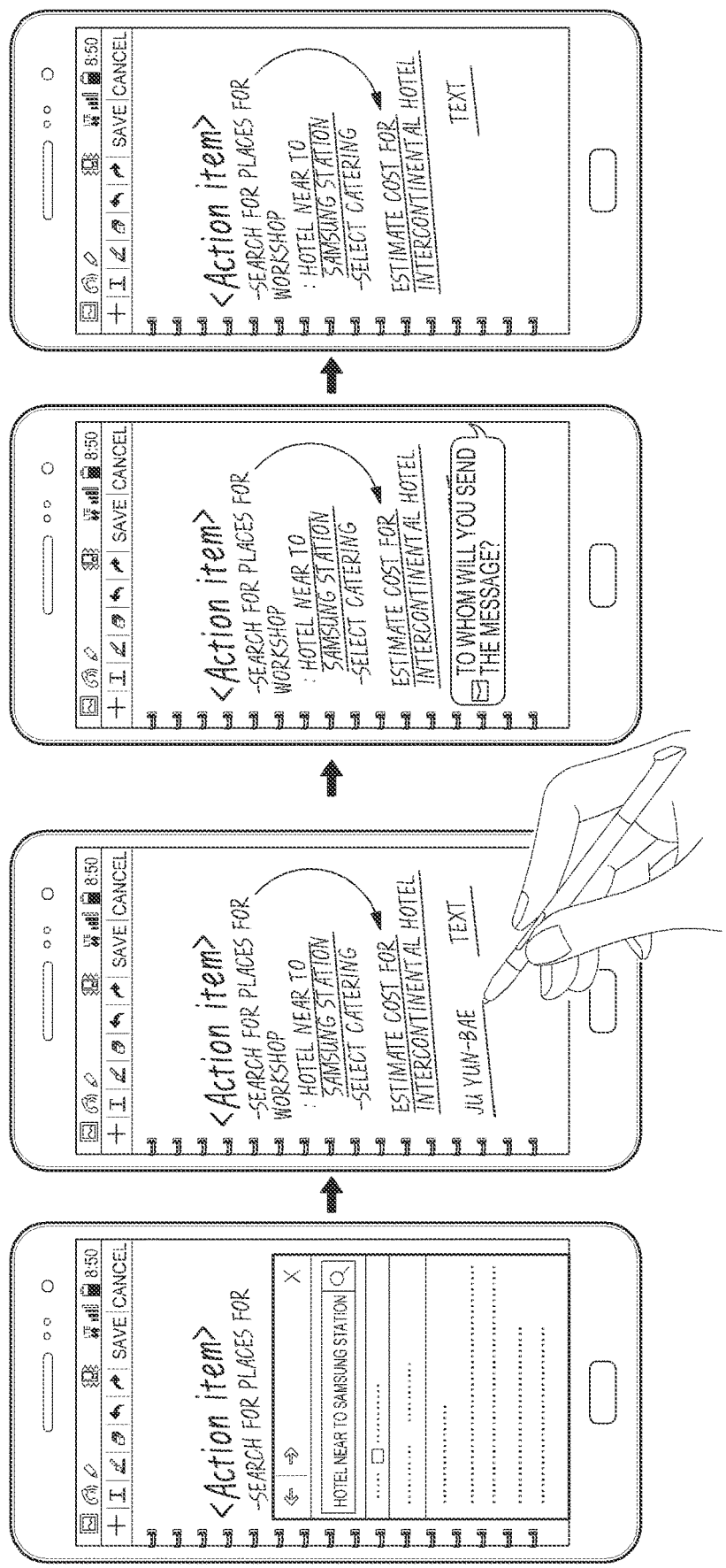

FIGS. 31A and 31B illustrate a scenario of supporting a hybrid UI in the user terminal according to an embodiment of the present disclosure.

Referring to FIGS. 31A and 31B, when the user underlines a part of a note written on a screen by the memo function in the user terminal, 'hotel near Samsung station', the user terminal displays menu icons available to the user in response to the underlining (refer to ①).

When the user selects a menu icon corresponding to voice recognition from among the menu icons displayed on the screen, the user terminal displays a message 'Speak' to prompt the user to input information by voice (refer to ②). The user terminal may output the message 'Speak' simultaneously in text and by voice.

If the user speaks 'Naver search' in response to the request from the user terminal, the user terminal analyzes the speech 'Naver search' by a natural language and thus assesses the user's intention (refer to ③). Then the user terminal determines that the user intends to 'search for' 'hotel near to Samsung station' using 'Naver'. Accordingly, the user terminal outputs search results regarding 'hotel near to Samsung station' from 'Naver' on the screen.

Therefore, the user may view the search results through the user terminal. Then the user writes 'estimate cost for Intercontinental hotel' and selects this note as contents to be processed by underlining the note by invoking a menu layer using the memo function. Then the user writes a command, herein 'text' and selects 'text' as the command (refer to ⑤).

However, information about a recipient is needed to send the text. Thus the user terminal displays a message asking the user who is a recipient, that is, 'To whom will you send the message?' (refer to ⑥).

When the user writes 'Ju Yun-BAE' on the screen by the memo function in response to the query message, the user terminal determines that the user intends to "send the contents 'estimate cost for Intercontinental hotel' to 'Ju Yun-BAE" (refer to ⑦). The user terminal should determine whether there is any phone number mapped to 'Ju Yun-BAE' in a directory. In the absence of any phone number mapped to 'Ju Yun-BAE', the user terminal may prompt the user to enter a phone number of 'Ju Yun-BAE' and send the message to the phone number received from the user.

While not shown, upon completion of the message transmission, the user terminal may output a message notifying completion of the message transmission on the screen so that the user may confirm the result of processing the command as requested.

As is apparent from the above description, the present disclosure can boost the use of a memo function with an electronic pen and the use of a voice recognition function in a user terminal. Since an intuitive interface is provided to a user, the user can use a function supported by the user terminal with convenience in the present disclosure.

It will be understood that the embodiments of the present disclosure can be implemented in hardware, software, or a combination thereof. The software may be stored in a volatile or non-volatile memory device like a ROM irrespective of whether data is deletable or rewritable, in a memory like a RAM, a memory chip, a device, or an integrated circuit, or in a storage medium to which data can be recorded optically or magnetically and from which data can be read by a machine (e.g., a computer), such as a CD, a DVD, a magnetic disk, or a magnetic tape.

The UI apparatus in a user terminal and the method for supporting the same according to the present disclosure can be implemented in a computer or portable terminal that has a controller and a memory, and the memory is an example of a machine-readable storage medium suitable for storing a program or programs including commands to implement the embodiments of the present disclosure. Accordingly, the present disclosure includes a program having a code for implementing the apparatus or method defined by the claims and a storage medium readable by a machine (e.g., a computer) that stores the program. The program can be transferred electronically through a medium such as a communication signal transmitted via a wired or wireless connection, which and the equivalents of which are included in the present disclosure.

Further, The UI apparatus in a user terminal and the method for supporting the same according to the present disclosure can receive the program from a program providing device connected by wire or wirelessly and store it. The program providing device may include a memory for storing a program with commands requesting implementation of the method of the present disclosure in the UI apparatus and information needed to implement the method, a communication module for communicating with the UI apparatus wirelessly or by wire, and a controller for transmitting a program to the UI apparatus automatically or upon request of the UI apparatus.

In embodiments, an overall operation of assessing a user's intention based on a recognized result of a recognition engine that configures a UI and providing the result of performing a process corresponding to the user's intention to a user is performed in the user terminal in the above embodiments of the present disclosure.

However, the user terminal may perform a function necessary for the present disclosure in conjunction with a server accessible through a network. In embodiments, the user terminal may provide the recognized result of the recognition engine to a specific server through the network and the specific server may assess the user's intention based on the received recognized result and provide the assessment result to the user terminal. If additional information is required regarding assessment of the user's intention only based on the recognized result or regarding processing the assessed user's intention, the additional information may be acquired by a question and answer procedure with the user terminal.

In embodiments, the user can selectively limit the operations of the present disclosure to the user terminal or extend the operations of the present disclosure to interworking with the server over the network by adjusting settings of the user terminal.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains While the present disclosure has been shown and described with reference to embodiments thereof, it will be understood by those skilled in the art that various changes in form and details may be made therein without departing from the spirit and scope of the present disclosure as defined by the appended claims and their equivalents.

What is claimed is:

1. A method for operating a user interface (UI) in a user terminal, the method comprising:
    receiving, from a touch screen of the user terminal, a first input associated with handwritten characters within a memo-based application and displaying the handwritten characters in the memo-based application on the touch screen of the user terminal;
    receiving, from the touch screen of the user terminal, a second input for selecting a portion of the handwritten characters within the memo-based application when at least the portion of the handwritten characters is displayed on the touch screen;
    receiving, from the touch screen of the user terminal, a third input associated with the portion of the handwritten characters, wherein the third input includes a combination of at least one handwritten symbol and at least one handwritten character;
    identifying, by at least one processor of the user terminal, in response to the receiving of the third input, a plurality of applications that are capable of performing one or more functions to process the portion of the handwritten characters based on content of the second input associated with the portion of the handwritten characters;
    displaying a menu icon corresponding to each application identified as capable of performing the one or more functions associated with processing the portion of the handwritten characters, each menu icon being displayed within the memo-based application on the touch screen of the user terminal;
    in response to receiving a fourth input associated with a first menu icon, determining, by using a natural language interaction, whether additional information is required for a first application associated with the first menu icon to perform the one or more functions associated with processing the portion of the handwritten characters; and
    in response to determining that no additional information is required for the first application to perform the one or more functions associated with processing the portion of the handwritten characters, executing the first application to perform the one or more functions associated with processing the portion of the handwritten characters.

2. The method of claim 1, wherein the handwritten characters are inputted using a finger or a touch electronic pen on the touch screen.

3. The method of claim 1, wherein the handwritten characters are inputted on the touch screen provided by a memo application.

4. The method of claim 1, wherein the handwritten characters include at least one handwritten command for processing the content of the second input.

5. The method of claim 1, wherein the displaying of the menu icon corresponding to each application identified as capable of performing the one or more functions associated with processing the portion of the handwritten characters comprises displaying a menu icon associated with at least one of a mail transmission application, a call application, a search application, or a message transmission application.

6. The method of claim 1, further comprising:
    in response to determining that additional information is required for the first application to perform the one or more functions associated with processing the portion of the handwritten characters:
        determining a plurality of different meanings based on the portion of the handwritten characters and the first menu icon,
        displaying, on the touch screen, at least one question generated based on the plurality of different meanings,
        receiving, from the touch screen, a fifth input including additional information provided in response to the at least one question, and
        executing the first application to perform the one or more functions associated with processing the portion of the handwritten characters based on the first menu icon, the portion of the handwritten characters, and the additional information.

7. A user terminal for operating a user interface (UI), the user terminal comprising:
    a touch screen; and
    at least one processor configured to:
        receive, from the touch screen, a first input associated with handwritten characters within a memo-based application and display the handwritten characters in the memo-based application on the touch screen,
        receive, from the touch screen, a second input for selecting a portion of the handwritten characters within the memo-based application when at least the portion of the handwritten characters is displayed on the touch screen,
        receive, from the touch screen, a third input associated with the portion of the handwritten characters, wherein the third input includes a combination of at least one ef-a handwritten symbol and at least one handwritten character,
        identify, by at least one processor of the user terminal, in response to the receiving of the third input, a plurality of applications that are capable of performing one or more functions to process the portion of the handwritten characters based on a content of the second input associated with the portion of the handwritten characters,
        display a menu icon corresponding to each application identified as capable of performing the one or more functions associated with processing the portion of the handwritten characters, each menu icon being displayed within the memo-based application on the touch screen,
        in response to receiving a fourth input associated with a first menu icon, determine, by using a natural language interaction, whether additional information is required for a first application associated with the first menu icon to perform the one or more functions associated with processing the portion of the handwritten characters, and
        in response to determining that no additional information is required for the first application to perform the one or more functions associated with processing the portion of the handwritten characters, execute the first application to perform the one or more functions associated with processing the portion of the handwritten characters.

8. The user terminal of claim 7, wherein the handwritten characters are inputted using a finger or a touch electronic pen on the touch screen.

9. The user terminal of claim 7, wherein the handwritten characters are inputted on the touch screen provided by a memo application.

10. The user terminal of claim 7, wherein the handwritten characters include at least one handwritten command for processing the content of the second input.

11. The user terminal of claim 7, wherein, to display the menu icon corresponding to each application identified as capable of performing the one or more functions associated with processing the portion of the handwritten characters, the at least one processor is further configured to display at least one menu icon associated with at least one of a mail transmission application, a call application, a search application, or a message transmission application.

12. The user terminal of claim 7, wherein the at least one processor is further configured to:
in response to determining that additional information is required for the first application to perform the one or more functions associated with processing the portion of the handwritten characters:
determine a plurality of different meanings based on the portion of the handwritten characters and the first menu icon,
display, on the touch screen, at least one question generated based on the plurality of different meanings,
receive, from the touch screen, a fifth input including additional information provided in response to the at least one question, and
execute the first application to perform the one or more functions associated with processing the portion of the handwritten characters based on the first menu icon, the portion of the handwritten characters, and the additional information.

13. A non-transitory computer readable storage medium with a computer program stored thereon, the computer program executable by at least one processor to perform the method of claim 1.

* * * * *